(12) United States Patent
Zhang et al.

(10) Patent No.: US 9,400,548 B2
(45) Date of Patent: Jul. 26, 2016

(54) GESTURE PERSONALIZATION AND PROFILE ROAMING

(75) Inventors: Zhengyou Zhang, Bellevue, WA (US); Alex Aben-Athar Kipman, Redmond, WA (US); Kenneth Alan Lobb, Sammamish, WA (US); Joseph Reginald Scott Molnar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 379 days.

(21) Appl. No.: 12/581,443

(22) Filed: Oct. 19, 2009

(65) Prior Publication Data

US 2011/0093820 A1    Apr. 21, 2011

(51) Int. Cl.
| G06F 3/033 | (2013.01) |
| G06F 3/01 | (2006.01) |
| A63F 13/20 | (2014.01) |
| A63F 13/40 | (2014.01) |
| G06K 9/00 | (2006.01) |

(52) U.S. Cl.
CPC ............... *G06F 3/011* (2013.01); *A63F 13/06* (2013.01); *A63F 13/10* (2013.01); *G06F 3/017* (2013.01); *A63F 2300/1093* (2013.01); *A63F 2300/552* (2013.01); *A63F 2300/5546* (2013.01); *A63F 2300/6045* (2013.01); *G06K 9/00335* (2013.01)

(58) Field of Classification Search
CPC ........................................................ G06F 3/011
USPC ............................................... 715/863; 710/8
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |

(Continued)

FOREIGN PATENT DOCUMENTS

| CN | 201254344 B | 6/2010 |
| EP | 0583061 A2 | 2/1994 |

(Continued)

OTHER PUBLICATIONS

Personalization and Context Aware Services: A Middleware Perspective—Published Date: Sep. 18, 2006 http://ftp1.de.freebsd.org/Publications/CEUR-WS/Vol-197/Paper1.pdf.

(Continued)

*Primary Examiner* — Andrey Belousov
(74) *Attorney, Agent, or Firm* — Steve Wight; Sandy Swain; Micky Minhas

(57) ABSTRACT

A gesture-based system may have default or pre-packaged gesture information, where a gesture is derived from a user's position or motion in a physical space. In other words, no controllers or devices are necessary. Depending on how a user uses his or her gesture to accomplish the task, the system may refine the properties and the gesture may become personalized. The personalized gesture information may be stored in a gesture profile and can be further updated with the latest data. The gesture-based system may use the gesture profile information for gesture recognition techniques. Further, the gesture profile may be roaming such that the gesture profile is available in a second location without requiring the system to relearn gestures that have already been personalized on behalf of the user.

21 Claims, 10 Drawing Sheets

(56) References Cited

U.S. PATENT DOCUMENTS

| | | |
|---|---|---|
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,583,946 A * | 12/1996 | Gourdol ............... 382/187 |
| 5,594,469 A | 1/1997 | Freeman et al. |
| 5,594,810 A | 1/1997 | Gourdol |
| 5,597,309 A | 1/1997 | Riess |
| 5,600,781 A | 2/1997 | Root |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,948,136 B2 | 9/2005 | Trewin |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,136,909 B2 | 11/2006 | Balasuriya |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,295,904 B2 * | 11/2007 | Kanevsky et al. ............... 701/36 |
| 7,308,112 B2 * | 12/2007 | Fujimura et al. ............... 382/103 |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |

(56) References Cited

U.S. PATENT DOCUMENTS

| | | | |
|---|---|---|---|
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2003/0156756 | A1* | 8/2003 | Gokturk et al. ............ 382/190 |
| 2004/0064597 | A1* | 4/2004 | Trewin ...................... 710/8 |
| 2007/0177803 | A1* | 8/2007 | Elias et al. .................. 382/188 |
| 2008/0026838 | A1 | 1/2008 | Dunstan et al. |
| 2008/0273764 | A1 | 11/2008 | Scholl |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Current Trends in Adaptive User Interfaces: Challenges and Applications—Published Date: Sep. 2007 http://ieeexplore.ieee.org/stamp/stamp.jsp?arnumber=04367705.

Sensor-based Situated, Individualized, and Personalized Interaction in Smart Environments—Published Date: Jul. 6, 2005—http://www9.informatik.tu-muenchen.de/publications/pdf/haemmerle05sensorbased.pdf.

Context-based User Profile Management for Personalized Services—Published Date: Jun. 17, 2005 http://ftp.informatik.rwth-aachen.de/Publications/CEUR-WS/Vol-149/paper11.pdf.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

GESTURE PERSONALIZATION AND PROFILE ROAMING

BACKGROUND

Many computing applications such as computer games, multimedia applications, office applications or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

A user may perform gestures in the physical space, where gestures are derived from a user's position or motion in the physical space. The gestures may control aspects of a system or application. Different users may have different ways and/or preferences of gestures to accomplish the same task. Disclosed herein are techniques for personalizing gestures. A gesture-based system may start with a generic description of properties for a gesture. Depending on how a user uses his or her gesture to accomplish the task, the system may refine the properties and the gesture may become personalized. The next time, the system can use the personalized gestures for gesture recognition, which may increase the accuracy and speed of gesture recognition. The personalized gesture information may be stored in a gesture profile and can be further updated with the latest data. The system may actively perform personalization by explicitly requesting the user to perform a gesture and capturing data about the gesture. The system may implicitly identify personalized features of a user's gesture by identifying features of a user's gestures during execution of a task in real-time.

A gesture profile may be generated and/or maintained by a computing environment that is local or remote to the user. A user may need to work on different systems (e.g., desktop, wall) and/or at different locations (e.g., office, hotel, home, friend's house). Disclosed herein are techniques for roaming a gesture profile to multiple locations. Thus, the user's personalized gestures may be available in a second location without requiring the system to relearn gestures that have already been personalized on behalf of the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION OF ILLUSTRATIVE EMBODIMENTS

Figure 1:
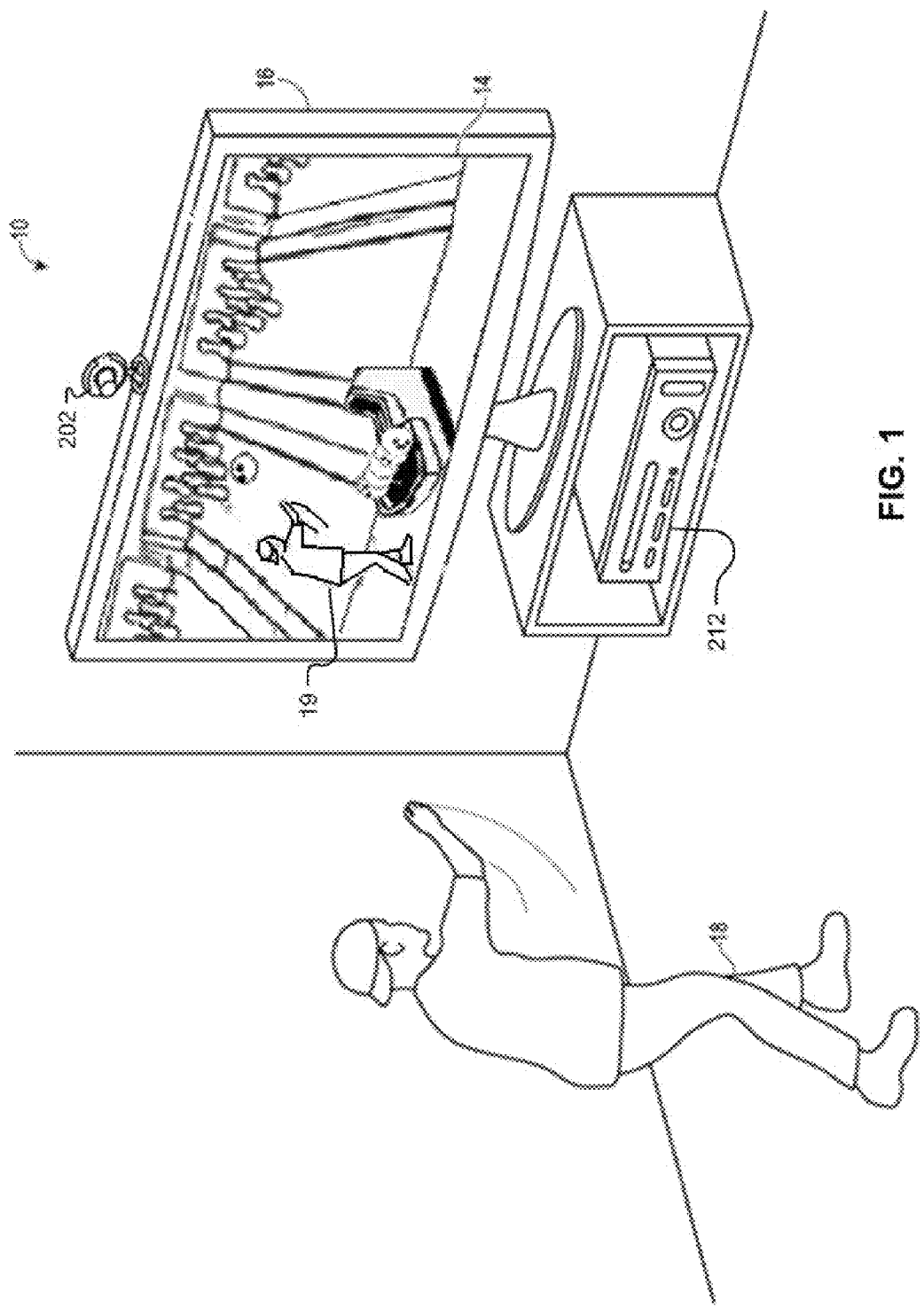
FIG. 1 illustrates an example embodiment of a target recognition, analysis, and tracking system with a user playing a game.

Disclosed herein are techniques for gesture profile personalization and gesture profile roaming. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

Embodiments are related to techniques for personalization of a gesture profile and techniques for profile roaming. A gesture may be derived from a user's position or motion in the physical space and may include any user motion, dynamic or static, such as running, moving a finger, or a static pose. According to an example embodiment, a capture device, such as a camera, may capture user image data include data that represents the user's gesture(s). A computer environment may be used to recognize and analyze the gestures made by the user in the user's three-dimensional physical space such that the user's gestures may be interpreted to control aspects of a system or application space. The computer environment may display user feedback by mapping the user's gesture(s) to an avatar on a screen.

A gesture-based system or application may have default gesture information for determining if a user is performing a particular gesture. For example, a system may have a gesture recognizer that compares captured data to a database of default gesture information such as filters with default gesture parameters. The gesture recognizer may compare data received by the capture device to the default gesture information and output a gesture. The output may include a confidence level that the output gesture was performed.

Not all users gesture in the same manner. Thus, the default gesture data provided by a system or application may not correlate to the particular way a user gestures. Thus, the system may not recognize the gesture or output a low confidence rating. Disclosed herein are techniques for generating a gesture profile comprising personalized gesture information. The gesture profile may be personalized for a user and accessed to replace or supplement default gesture information.

A gesture profile may be generated and/or maintained by a computing environment that is local or remote to the user. A user may need to work on different systems (e.g., desktop, wall) and/or at different locations (e.g., office, hotel, home, friend's house). Disclosed herein are techniques for roaming the gesture profile. For example, a gesture profile generated locally may be uploaded to a remote server such that the user may move to a different location or use a different computing environment in the same location and download the gesture profile to a computing environment at the different location or to the different computing environment in the same location.

The system, methods, techniques, and components of personalization of a gesture profile and profile roaming may be embodied in a multi-media console, such as a gaming console, or in any other computing environment in which it is desired to display a visual representation of a target, including, by way of example and without any intended limitation, satellite receivers, set top boxes, arcade games, personal computers (PCs), portable telephones, personal digital assistants (PDAs), and other hand-held devices.

FIG. 1 illustrates an example embodiment of a configuration of a target recognition, analysis, and tracking system 10 that may employ the disclosed techniques for gesture personalization and gesture profile roaming. In the example embodiment, a user 18 is playing a bowling game. In an example embodiment, the system 10 may recognize, analyze, and/or track a human target such as the user 18. The system 10 may gather information related to the user's motions, facial expressions, body language, emotions, etc, in the physical space. For example, the system may identify and scan the human target 18. The system 10 may use body posture recognition techniques to identify the body type of the human target 18. The system 10 may identify the body parts of the user 18 and how they move.

As shown in FIG. 1, the target recognition, analysis, and tracking system 10 may include a computing environment 212. The computing environment 212 may be a multimedia console, a personal computer (PC), a gaming system or console, a handheld computing device, a PDA, a mobile phone, a cloud computer, or the like. According to an example embodiment, the computing environment 212 may include hardware components and/or software components such that the computing environment 212 may be used to execute applications. An application may be any program that operates or is executed by the computing environment including both gaming and non-gaming applications, such as a word processor, spreadsheet, media player, database application, computer game, video game, chat, forum, community, instant messaging, or the like.

As shown in FIG. 1, the target recognition, analysis, and tracking system 10 may include a capture device 202. The capture device 202 may be, for example, a camera that may be used to visually monitor one or more users, such as the user 18, such that gestures performed by the one or more users may be captured, analyzed, and tracked to perform one or more controls or actions within an application. In the example embodiment shown in FIG. 1, a virtual object is a bowling ball and the user moves in the three-dimensional physical space as if actually handling the bowling ball. The user's gestures in the physical space can control the bowling ball displayed on the screen 14. In example embodiments, the human target such as the user 18 may actually have a physical object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 212 may include a video adapter such as a graphics card and/or an audio adapter such as a sound card that may provide audiovisual signals associated with the game application, non-game application, or the like. The audiovisual device 16 may receive the audiovisual signals from the computing environment 212 and may then output the game or application visuals and/or audio associated with the audiovisual signals to the user 18. According to one embodiment, the audiovisual device 16 may be connected to the computing environment 212 via, for example, an S-Video cable, a coaxial cable, an HDMI cable, a DVI cable, a VGA cable, or the like.

As used herein, a computing environment may refer to a single computing device or to a computing system. The computing environment may include non-computing components. As used herein, a computing system, computing device, computing environment, computer, processor, or other computing component may be used interchangeably. For example, the computing environment may comprise the entire target recognition, analysis, and tracking system 10 shown in FIG. 1. The computing environment may include the audiovisual device 16 and/or the capture device 202. Either or both of the exemplary audiovisual device 16 or capture device 202 may be an entity separate but coupled to the computing environment or may be part of the computing device that processes and displays, for example.

As shown in FIG. 1, the target recognition, analysis, and tracking system 10 may be used to recognize, analyze, and/or track a human target such as the user 18. For example, the user 18 may be tracked using the capture device 202 such that the gestures of user 18 may be interpreted as controls that may be used to affect the application being executed by computer environment 212. Thus, according to one embodiment, the user 18 may move his or her body to control the application. The system 10 may track the user's body and the motions made by the user's body, including gestures that control aspects of the system, such as the application, operating system, or the like.

The system 10 may translate an input to a capture device 202 into an animation, the input being representative of a user's motion, such that the animation is driven by that input. Thus, the user's motions may map to a visual representation, such as an avatar, such that the user's motions in the physical space are emulated by the avatar. The rate that frames of image data are captured and displayed may determine the level of continuity of the displayed motion of the visual representation.

FIG. 1 depicts an example embodiment of an application executing on the computing environment 212 that may be a bowling game that the user 18 may be playing. In this example, the computing environment 212 may use the audiovisual device 16 to provide a visual representation of a bowling alley and bowling lanes to the user 18. The computing environment 212 may also use the audiovisual device 16 to provide a visual representation of a player avatar 19 that the user 18 may control with his or her movements. The computer environment 212 and the capture device 202 of the target recognition, analysis, and tracking system 10 may be used to recognize and analyze the gestures made by the user 18 in the user's three-dimensional physical space such that the user's gestures may be interpreted to control the player avatar 19 in game space. For example, as shown in FIG. 1, the user 18 may make a bowling motion in a physical space to cause the player avatar 19 to make a bowling motion in the game space. Other movements by the user 18 may also be interpreted as controls or actions, such as controls to walk, select a ball, position the avatar on the bowling lane, swing the ball, etc.

Multiple users can interact with each other from remote locations. The computing environment 212 may use the audiovisual device 16 to provide the visual representation of a player avatar that another user may control with his or her movements. For example, the visual representation of another bowler on the audiovisual device 16 may be representative of another user, such as a second user in the physical space with the user, or a networked user in a second physical space.

Gestures may be used in a video-game-specific context such as the bowling game example shown in FIG. 1. In another game example such as a driving game, various motions of the hands and feet may correspond to steering a vehicle in a direction, shifting gears, accelerating, and breaking. The player's gestures may be interpreted as controls that correspond to actions other than controlling the avatar 19, such as gestures used for input in a general computing context. For instance, various motions of the user's 18 hands or other body parts may to end, pause, or save a game, select a level, view high scores, communicate with a friend, etc.

While FIG. 1 depicts the user in a video-game-specific context, it is contemplated that the target recognition, analysis, and tracking system 10 may interpret target movements for controlling aspects of an operating system and/or application that are outside the realm of games. Virtually any controllable aspect of an operating system and/or application may be controlled by movements of the target such as the user 18. For example, the user's gestures may correspond to common system wide tasks such as navigate up or down in a hierarchical list, open a file, close a file, and save a file. The user's gesture may be controls applicable to an operating system, non-gaming aspects of a game, or a non-gaming application. For example, the user's gestures may be interpreted as object manipulation, such as controlling a user interface. For example, consider a user interface having blades or a tabbed interface lined up vertically left to right, where the selection of each blade or tab opens up the options for various controls within the application or the system. The system may identify the user's hand gesture for movement of a tab, where the user's hand in the physical space is virtually aligned with a tab in the application space. The gesture, including a pause, a grabbing motion, and then a sweep of the hand to the left, may be interpreted as the selection of a tab, and then moving it out of the way to open the next tab.

Different users may have different ways and/or preferences to accomplish the same task and may have different ways and/or preferences for the gesture related to the task. For example, a user may prefer to use a checkmark to indicate "checked" while others may use an X. A user may have a different manner for performing the gesture, such as quicker or more exaggerated motions. As will be described in more detail below, a user may have a gesture profile associated with the user. The gesture profile may comprise gesture information personalized for the particular user, allowing the system to adapt gesture data to the user. For example, the gesture profile may include information for a particular gesture that is specific to the manner in which the user performs the gesture. In the "checked" example, the gesture profile could indicate that the user's preference for "checked" is a checkmark and include parameters for the gesture that correspond to a checkmark. For example, the gesture may be defined by a trajectory of points and range of speed that corresponds to the motion of a hand and an arm making a checkmark motion in the physical space. By using the gesture profile, the system 10 can adapt gesture recognition for the "checked" gesture to the user's preference and to the manner in which the user performs the checkmark motion.

Figure 2:
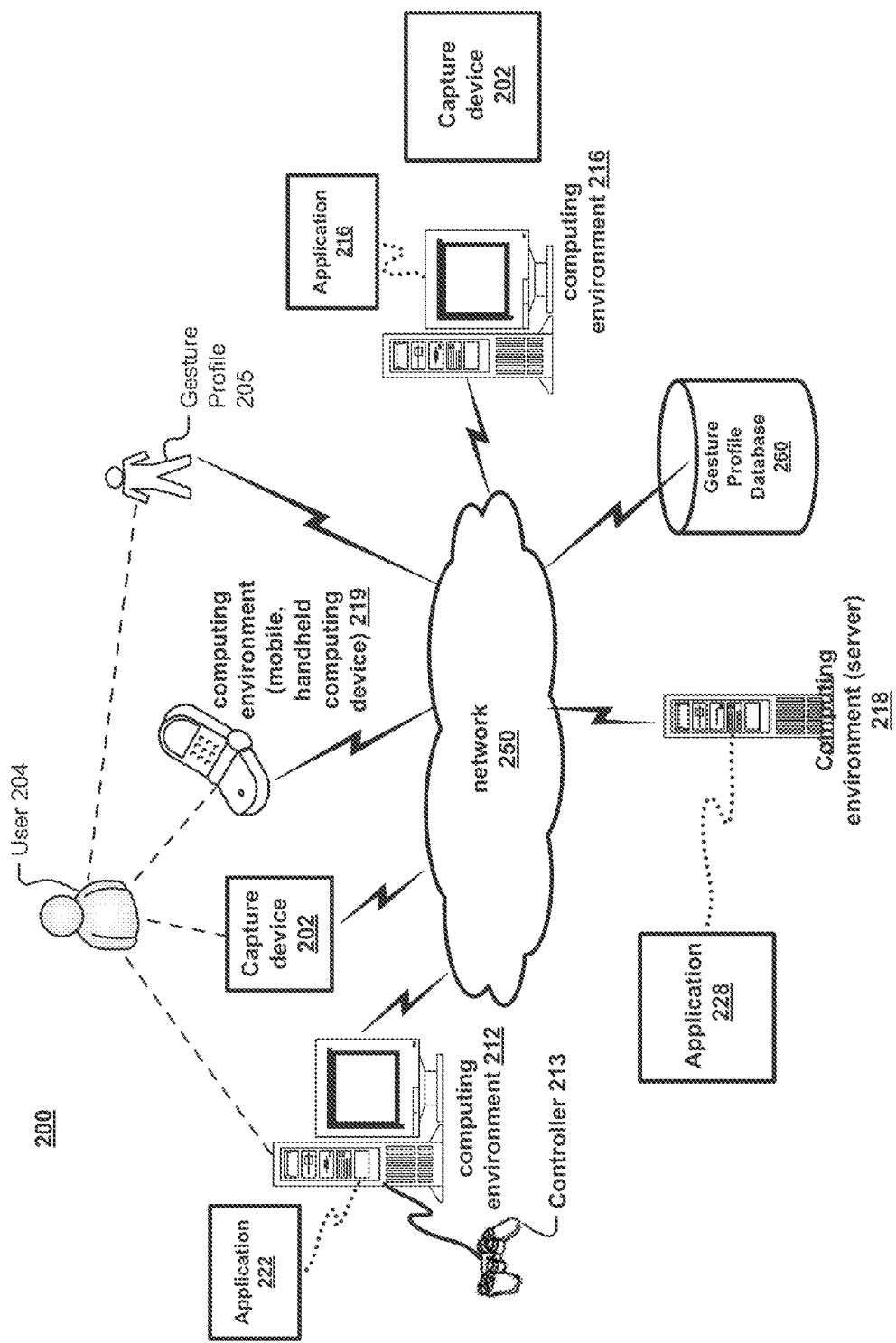
FIG. 2 illustrates an example embodiment of a computing environment in which gesture profiles may be available over a network.

FIG. 2 illustrates an example system 200 in which a personalized gesture profile may roam over a network, such as between computing environments. System 200 may include a computing environment 212, 216, 218, 219, capture devices 202, 203, a gesture profile 205, and a gesture profile database 260. In this example, computing environment 212 is shown executing application 222, computing environment 218 is shown executing application 228, and computing environment 216 is shown executing application 217. The user 204 is shown locally associated with computing environment 212, capture device 202, computing environment 219 (shown as a mobile, handheld computing device), and gesture profile 205. A computing environment may be a multimedia console, a personal computer (PC), a gaming system or console, a handheld computing device, a PDA, a mobile phone, a cloud computer, or the like. For example, each computing device 212, 216, 218, 219 may be a dedicated video game console or a more general computing device, such as a cellular telephone or a personal computer. Computing environment 218 is shown as a server and computing environment 219 is shown as a mobile handheld computing device.

As used herein, reference to a system may be a reference to any single part of the system 200 shown in FIG. 2, any combination thereof, or any additional component or computing environment that can perform a similar function. For example, the computing environment 212 may provide the functionality described with respect to the computing device 212 shown in FIG. 1 or the computer described below with respect to FIG. 8. It is contemplated that any one of the computing environments 212, 216, 218, 219 may be configured as a target recognition, analysis, and tracking system such as the 10 target recognition, analysis, and tracking system shown in FIG. 1, and any one of the computing environments may employ techniques for gesture personalization and gesture profile roaming. As shown in FIG. 2, the computing environment 212 may include a display device and a processor. The computing environment 212 may comprise its own camera component or may be coupled to a device having a camera component, such as capture device 202. For example, computing environment 212 may be coupled to or otherwise receive gesture information for user 204 from the capture device 202 that can capture data from the physical space.

In these examples, a capture device 202 can capture a scene in a physical space in which a user is present. The user 204 is within capture view of the capture device 202 that can capture data representative of the user's gestures. The capture device 202 can provide the data to any computer environment for processing or may have a processor itself for analyzing the data. For example, a depth camera 202 can process depth information and/or provide the depth information to a computer, such as a local computing environment 212. The computing environment 212 may analyze the captured data to identify the user's gestures and map the user's gestures to the display. For example, the depth information can be interpreted for display of a visual representation of the user 204. The capture device 202 may provide the data over a network 250 for analysis by a remote computing environment, such as computing environment 218 or 219. Thus, a computing environment remote to the user may process data captured by a capture device local to the user 204 and display a visual representation of the user at the remote computing environment.

In another example embodiment, the mobile, handheld computing device 219 may be coupled to the capture device 202. The handheld computing device 219 may itself have data capture and gesture recognition capabilities. For example, the handheld computing device 219 may have a capture device that is a component of the handheld computing device 219 or otherwise coupled to the handheld computing device 219 to share image data. The handheld computing device 219 may process the image data and generate a gesture profile with gesture information specific to the user. The mobile handheld computing device 219 can process the data and/or provide the data to another computing environment. The handheld computing device 219 may store the generated gesture profile.

System and application developers may incorporate packages of standard gestures into their systems and/or applications for gesture recognition. The packages may be pre-packaged with the application or computing environment, for example, as a default set of gestures. Gestures may be universal, system-wide, application-specific, user-specific, environment-specific, etc. In this example embodiment, the user is interacting with computing environment 212 that is executing application 222. Gesture information may comprise both gestures that control aspects of the computing environment 212 and/or the executing application 222.

The default gesture information may correspond to various controls, such as select file, open file, close file, power off, load an application, etc. For each gesture, the system may start with a generic description of the gesture properties. As described in more detail below with respect to the gesture recognition architecture, gesture information can include any identifiable parameter(s) of the user's gesture, including ranges, speeds, accelerations, velocities, etc. For example, a gesture may be represented by a trajectory of points of the user's body. As the user moves, a trajectory representing a sequence of points of the user's body may be tracked between captured images. If the trajectory resembles the trajectory defined for the gesture, or falls within an acceptable range for the trajectory defined for the gesture, the system may return an identity of that gesture. For example, a baseball throwing gesture or a portion thereof may have as a parameter a volume of space in which it must occur. This volume of space may typically be expressed in relation to the body where a gesture comprises body movement. For instance, a baseball throwing gesture for a right-handed user may be recognized only in the volume of space no lower than the right shoulder, and on the same side of the head as the throwing arm.

The system may identify parameters that correspond to the manner in which the user performs a particular gesture, and store this information in the user's gesture profile 205. For example, user 204 is shown associated with a gesture profile 205. Thus, depending on how a user gestures to accomplish the task or control an aspect of the system, the system may refine the properties of a gesture by storing gesture information in a gesture profile such that gesture information may become personalized. For example, the parameters for the volume of space that are used to identify a gesture as an overhand throw may be set to default values in accordance with research or simulation data. A user's hand, however, may tend to be a distance further from the user's head than is common A gesture profile associated with the user may include parameters for the volume of space identifying the baseball throwing gesture that corresponds to the specific user's baseball throw.

The system may use the captured image data in any suitable manner for refining the default gesture data with respect to the specific user. The gesture information specific to the user may be populated in the user's profile, aggregating information related to the gesture. For example, the system may identify geometric features of the user's body in the way that the user's limbs move, at what speed, in what volume of space, etc. The system may identify the features based on, for example, a body scan, a skeletal model, the extent of a user 602 on a pixel area, or any other suitable process or data. The computing system 610 may use body recognition techniques to interpret the image data and may determine the size, shape and depth of the user's 602 appendages. The system may compute average feature values for the manner in which the specific user's body parts move and identify them for each type of gesture. The image data may provide a series of still images to identify features of gesture performance that are specific to the user. For example, between images, the features of the user's body when performing a gesture can be compared to determine angles, lengths, distance between points. The frequency of the images may increase the fidelity of the user's movements. The system may analyze image data using techniques of Bayesian inference to learn the behavioral patterns of a user. The system may normalize the refined gesture data to correspond to a user's height detected by the system or input by the user.

The gesture profile may be a computer representation of information associated with the user, related to gestures. The gesture profile may include gesture information in the form of a mathematical expression, a collection of wire frame snapshots, image data, e.g., static photographic images, animations, text, or any combination thereof, and may be embodied in hardware, software, firmware, or the like. Image data may be in the form of pixel or vector (geometric) data. The gesture profile may be in the form of a plug-in, add-on, or extension file format that can interact with a computing environment or application, e.g., a web browser, a game, an operating system) to provide the gesture profile. The gesture profile may include or otherwise associate with a specification document or metadata that describes how the data in the gesture profile is to be encoded. For example, as described below, aspects of the computing environments that may activate the gesture profile may vary such that the specification document identifies the manners in which the aspects further modify the roaming gesture profile information.

In the future, during gesture recognition, the system may use information in the user's gesture profile to fine-tune the gesture recognition techniques for the particular user. Thus, the personalized gesture profile may become part of the analysis of the user's gestures such that the gestures are analyzed with respect to either or both the default gesture information and the gesture profile that is personalized for the particular user. By using the personalized gesture information from the gesture profile, the system may more fully identify and/or distinguish the user's gestures, thus providing more accuracy and speed for gesture recognition. The gesture profile 205 can be updated at any time, allowing gestures to be further updated with the latest data and storing any modifications to the gesture data for the particular user.

The system may refine default aspects of the gesture itself or identify other characteristics that correspond to the gesture. For example, the system can identify tendencies in a user's facial expressions, body positions, language, speech patterns, skeletal movements, words spoken, history data, voice recognition information, etc, that correlate to the user's gesture, and indicate the correlation in the gesture profile, for example. In the future, when the user performs the gesture, if the additional aspects or characteristics are also detected, the system may use the gesture profile data to more quickly and with increased confidence identify a gesture from the image data. For example, if the user tends to open his mouth when gesturing to hit a tennis ball in a tennis game application, or the user grunts during a serving gesture in the tennis game application, the system may include information in the gesture profile that correlates these characteristics of the user to the particular gesture.

Two example gestures are 1) a select file gesture comprising a user pointing and 2) an open file gesture comprising a clutching motion. The computing environment 212 may identify a user's pointing motion as the select file gesture and display a pointer on the screen that corresponds to the user's gesture. When the user has moved the pointer on the screen, by pointing in the physical space, to a desired file displayed on the screen, the user's clutching motion may be identified as the gesture for opening the selected file. It is contemplated that any computing environment networked to the capture device, either directly via network 250 or indirectly, e.g., via computing environment 212, may process the image data from a capture device 202 capturing the user.

In an example embodiment, the gesture profile may supplement the default gesture information. For example, the user may tend to use two fingers for a pointing motion defining the select file gesture, and the user may make short, quick clutch motions for the open file gesture. The gesture could be identified without the gesture profile, but supplementing the default gesture information with additional traits specific to the user in relation to the gesture may increase the speed and confidence with which the system recognizes the gesture.

In another example embodiment, the gesture profile may replace the default gesture information for a particular gesture or otherwise indicate that, for the particular gesture, the gesture profile supersedes the default gesture information and should be used for gesture recognition. For example, the user's pointing gesture could comprise the use of an object, where the object is scanned by the capture device and identified as an object held by the user. The gesture profile may indicate that, instead of analyzing the user's pointing gesture with default gesture information, the analysis should be the gesture parameters defined with respect to the object, set specifically to the manner in which the particular user points. In another example, a crouch gesture may be applicable in a game or other application. However, the user may be injured and unable to crouch in the physical space as required for the recognition of the particular gesture. The gesture profile may include modified parameters for the crouch gesture that represent the modified manner in which the user performs the crouch gesture. When activated, the gesture profile may overwrite the default gesture information, thereby providing comprehensive gesture information for the particular gesture and superseding the default gesture information.

A gesture-based system, whether providing gesture-based services to local users or to a plurality of local and/or remote users, may compile personalized gesture information. For example, a local system may compile personalized gesture information from each of the local users that access the system. A more broadly available gesture-based system, such as a server on a network that services a plurality of remote users, may compile personalized gesture information from a multitude of remote users. The information in a plurality of gesture profiles, that may each be specific to a particular user, may be compiled and made available to different users.

The personalized gesture information may be used to update or improve the default gesture data that is pre-packaged and provided by the system. By aggregating personalized gesture data from a plurality of users, the system may combine information from a plurality of gesture profiles and modify default gesture data. For example, a gaming network may compile information from various personalized gesture profiles and use the data for the development of future pre-packaged gesture data. For existing users, the network may update the pre-packaged data for existing applications and perform an update to systems on the network to implement the updated pre-packaged gesture data. Current users that already have a personalized gesture profile may benefit from the updated gesture data for default gestures that have not yet been personalized for the current user. Thus, both new users, current users, new applications, and current applications may benefit from the analysis of aggregated personalized gesture data.

The system may intelligently update default or pre-packaged gesture data such that it corresponds better to the more prevalent manner in which a set of users serviced by the system perform particular gestures. For example, the system may modify pre-packaged gesture data to correspond to tendencies identified in an aggregation of the personalized gesture data. The modification may be made for a particular program or a particular control of the gesture-based system. The system may modify the gesture for users of a local system or for users in a particular region that perform gestures in a similar manner that deviates from the default gesture data provided by the system. For example, as described below, a context may apply for a particular region or even for a set of users within a single household.

The gesture profile may comprise an indication of contextual information that is specific to the user 204. For example, a cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia. Similarly, there may be different contexts, or contextual circumstances, among different environments of a single application. Take a first-user shooter game that involves operating a motor vehicle. While the user is on foot, making a first with the fingers towards the ground and extending the first in front and away from the body may represent a punching gesture. While the user is in the driving context, that same motion may represent a "gear shifting" gesture. The user's gesture profile may be personalized to indicate the context of the user, identified passively based on the user image data or as input by the user upon initiation of the gesture profile.

Like gestures, the gesture profile may be applicable to control aspects of an application, a system, a computing environment, or the like, and may be applicable for either or both gaming and non-gaming features. For example, the user may control aspects of the computing environment, via gestures, such as open file, load application. Gestures may vary between different applications, the system, based on a context, based on an environment, or the like. For example, an open file gesture may be defined for a LINUX operating system to be different than the open file gesture for a WINDOWS operating system. Similarly, a jumping gesture in a first game application may be defined differently than the jumping gesture in a second game application. The gesture profile may include identifiers where appropriate to indicate under what circumstances the gesture profile information is appropriate.

It is contemplated that any computing environment in the system may generate the gesture profile, such as a local or computing environment. The generation of the gesture profile 205 may be initiated by any component of the system, e.g., a computing environment or server, an entity interacting with the system, e.g., the user, a system administrator. The gesture profile may be stored on the same computing environment that generates the gesture profile or it may be stored remotely.

The gesture profile 205 may be activated, such as loaded or otherwise accessed by a local computing environment for use in recognizing the user's gestures. Depending on where the gesture profile is stored, the gesture profile may be activated from storage on the local computing environment or accessed from another computing environment via network 250, for example. The user or system may request activation of the gesture profile via the local computing environment. For example, a computing environment may have an input/output component that may include, for example, an input component such as a keypad, a touch screen, a button, a microphone, or the like, and an output component such as a transmitter, a speaker, a microphone, or the like. A user, associated with the local computing device 212, can interact with the local computing device 212 via the input/output component or via a gesture to request access to a gesture profile.

The personalized gesture profile may be activated manually or automatically. For example, a manual activation may include the user logging on or requesting the activation of the gesture data. Activation may occur in response to a triggering event, such as when a user powers on or logs on to a computing environment. The activation of the gesture profile may be triggered when the computing environment recognizes the user based on profile data or based on an IP address, for example. The execution of a particular application may trigger the activation of a user's gesture profile. In other embodiments, the gesture profile may not need to be activated; the gesture profile may always be active, for example.

An automatic activation may include the system identifying a user through face recognition, speaker identification, fingerprint scanning, gesture profile comparison, or the like. For example, the computing environment 212 may select the appropriate gesture profile 205 to load by identifying the user. The gesture profile, or a user profile separate from the gesture profile, may include user profile data such as the user's scanned or estimated body size, skeletal models, body models, voice samples or passwords, the user's age, facial recognition, voice recognition, fingerprint scanning, previous gestures, user limitations, standard usage by the user of the system, such as, for example a tendency to sit, left or right handedness, or a tendency to stand very near the capture device, or any combination thereof. This information may be used to determine if there is a match between a user in a capture scene and one or more gesture profiles. In another example, the user logs onto the system or inputs a user name that identifies the user to extract the appropriate gesture profile. The computing environment may have a plurality of users and, accordingly, may be capable of activating a gesture profile correlating to each of the current users of the device.

The computing environment may only need to activate a portion of the gesture profile. The gesture profile may have any number of segments comprising gesture information for specific circumstances. For example, the user's gestures in a certain application may be modified differently from the same gestures for a different application. Thus, the computing environment may only request to access a portion of the gesture profile that is appropriate for the computing environment. This can save bandwidth and local storage space. It is noted that the user could also have multiple associated gesture profiles or they may be combined to create a single gesture profile.

The gesture profile may be stored locally or remotely on a media, e.g., a removable or non-removable media, on a computing environment, e.g., computing environment 212, 216, 218, 219. The media can be removable storage and/or non-removable storage including, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information. The storage media may be implemented in any method or technology for storage of information such as computer readable instructions, data structures, program modules, or other data.

The user may wish to transfer the stored gesture profile to a mobile storage media to carry the gesture profile data with the user. The storage media may be inserted into the local computing environment to copy the gesture profile to the storage media. The storage media may then be removed and received by another computing environment, such as computing environment 216, 218, 219.

In another embodiment, the gesture profile 205 may be a roaming profile that travels with the user in a networked environment, allowing for location independent access to a saved gesture profile. In this manner, a computing environment that has access to the roaming gesture profile does not need to re-learn a user's personalized gesture information that is already available in a gesture profile. For example, the collection of information in the roaming gesture profile may be seamlessly shared between different computing environments or application in the network. Multiple computing environments may connect remotely and/or locally over a network, sometimes accessing the same applications via a local computing environment. Multiple users may be associated with any number of computing environments to create a multi-user experience.

A roaming gesture profile may provide users the ability to save a profile in a first location, but access the gesture profile from anywhere. In an embodiment, a roaming gesture profile may enable users to upload or download locally saved gesture profiles when they sign in to an online service, such as an online gaming service. The user may have to provide authentication credentials to download the saved gesture profile from another computing environment. The gesture profile may be automatically saved periodically and uploaded to the roaming gesture profile service. This automatic function may be performed in the background, not visible to the user.

The computing environments on the same network can share files and access files and settings local to another computing environment, such as a gesture profile. The gesture profile may be accessed from a remote computing environment in various manners. For example, a user may stream a gesture profile over a network, such as the Internet. A web browser may be viewable on the local computing environment 212, and the user may browse the Internet via the input/output component. The user may select or "click on" a gesture file that is accessible from a server 218 to download or stream to the user's local machine, such as computing device 212. The gesture profile may be stored by the local computing environment as a copy or back-up version of the gesture profile that is accessible via the network. In some instances, a temporary gesture profile may be cached or otherwise stored temporarily on a local machine. The information in the temporary gesture profile may be used to refresh or add to the user's gesture profile stored elsewhere, such as by uploading the gesture profile to a central gesture profile database 260 via the network 250. Then, the user may download the gesture profile later from another computing environment in a second location. The gesture profile may be compressed for storage or transmission.

As shown in FIG. 2, computing environments 212, 216, 218, 219 may communicate with one another by way of a network 250. A network 250 may include, for example, an intranet, an internet, the Internet, a personal area network (PAN), a campus area network (CAN), a local area network (LAN), a wide area network (WAN), a computer network, a gaming network, or the like. The network 250 may also represent the technology that connects individual devices in the network, such as optical fibre, a public switched telephone network (PSTN), a cellular telephone network, a global Telex network, wireless LAN, Ethernet, power line communications, or the like. Computing environments may be connected together by wired or wireless systems, by local networks or widely distributed networks. Any appropriate wireless interface can be utilized for network communications. For example, the wireless link can be in accordance with the following protocols: GSM, CDMA, UMTS, LTE, WIMAX, WIFI, ZIGBEE, or a combination thereof. A network may include cloud or cloud computing. A cloud infrastructure, for example, may include a multitude of services delivered through data centers and built on servers. The services may be accessible anywhere that provides access to the networking infrastructure. The cloud may appear to be a single point of access to the user and the infrastructure may not be visible to a client.

The network 250 may be any network arranged so that messages may be passed from one part of the network to another over any number of links or nodes. It is contemplated that any number of links or nodes may exist on the network, and any number of networks may be connected by at least one link or node from another network. For example, the computing environments 212, 216, 218, 219 may each be a node on the network 250. Each computing environment 212, 216, 218, 219 may execute applications but can also access other nodes (e.g., other computing environments) and applications executing on or devices connected to other nodes, anywhere on the network 250. Thus, a user of a local computing environment may use the network to share data (e.g., files, databases), interact with other applications, share devices (e.g., printers), communicate with other users (e.g., email, chat), etc. For example, a user 204 of computing environment 212 may access an application executing on the computing environment 216 via the user's local computing environment 212 via the network 250. Any number of users associated with any number of respective local computing environments may access the same application via the network 250.

A computing environment 212, 216, 218, 219 may be configured to recognize gestures and process, store, distribute, upload, download, update, or the like, gesture information. A gesture profile may be generated and/or maintained by any computing environment that is local or remote to the user. The network topology enables any computing environment that has access to the network to access the gesture profile from another computing environment. For example, a gesture profile generated locally by computing environment 212 may be uploaded to a remote server 218. The user 204 may move to a different location, or use a different computing environment in the same location, and download the gesture profile to a computing environment at the different location, or to the different computing environment in the same location. For example, user 204 may go to a friend's house where the local computing environment is computing environment 216. If the gesture profile is stored locally on computing environment 212, the computing environment 216 may communicate with computing environment 212 via network 250 and request the gesture profile 205 associated with the user 204.

In an example embodiment, the network 250 comprises an Xbox LIVE network accessible via a broadband connection maintained by server 218. Computing device 212, local to the user 204, and computing environment 216, remote to user 204, could be XBOX game consoles that can execute the same game from the server 218. The Xbox game consoles 212, 216 may be executing an application locally or via a remote computer connection. Game console 212, local to the user 204, may have a capture device and capture image data representative of the user's gestures. The game console 212 may be coupled to the capture device 202 and process the image data to recognize the user's gestures made in the physical space. Computing environment 212 may generate a gesture profile and store it locally thereon. The computing environment 212 may upload or otherwise transmit the information over network 250 to the Xbox LIVE server 218. The Xbox LIVE server may maintain a gesture profiles database 260 for users that have access to the Xbox LIVE service.

In another example embodiment, the network 250 comprises an Internet connection to a server 218 that is providing a movie service. Computing environment 212 could be a DVD player, computing device 219 could be a handheld computing device, and computing environment 216 could be a PC that connects to the Internet via an Ethernet cable or Wi-Fi, for example. Thus, all three computing environments 212, 216, 219 could connect to the server 218 to access, stream, download, select, etc, movies. A gesture profile may be generated by any of the three computing environments 212, 216, 219 that process image data representative of the user's gestures in the physical space. The gesture profile may be stored locally on the computing environment that generated the profile, or it may be stored remotely, such as by the server 218 that provides the movie service. Similarly, the service may have a gesture profile database 260 for storing gesture profiles for the user's that have access (e.g., a subscription, freeware access, etc) to the service.

Figure 6:
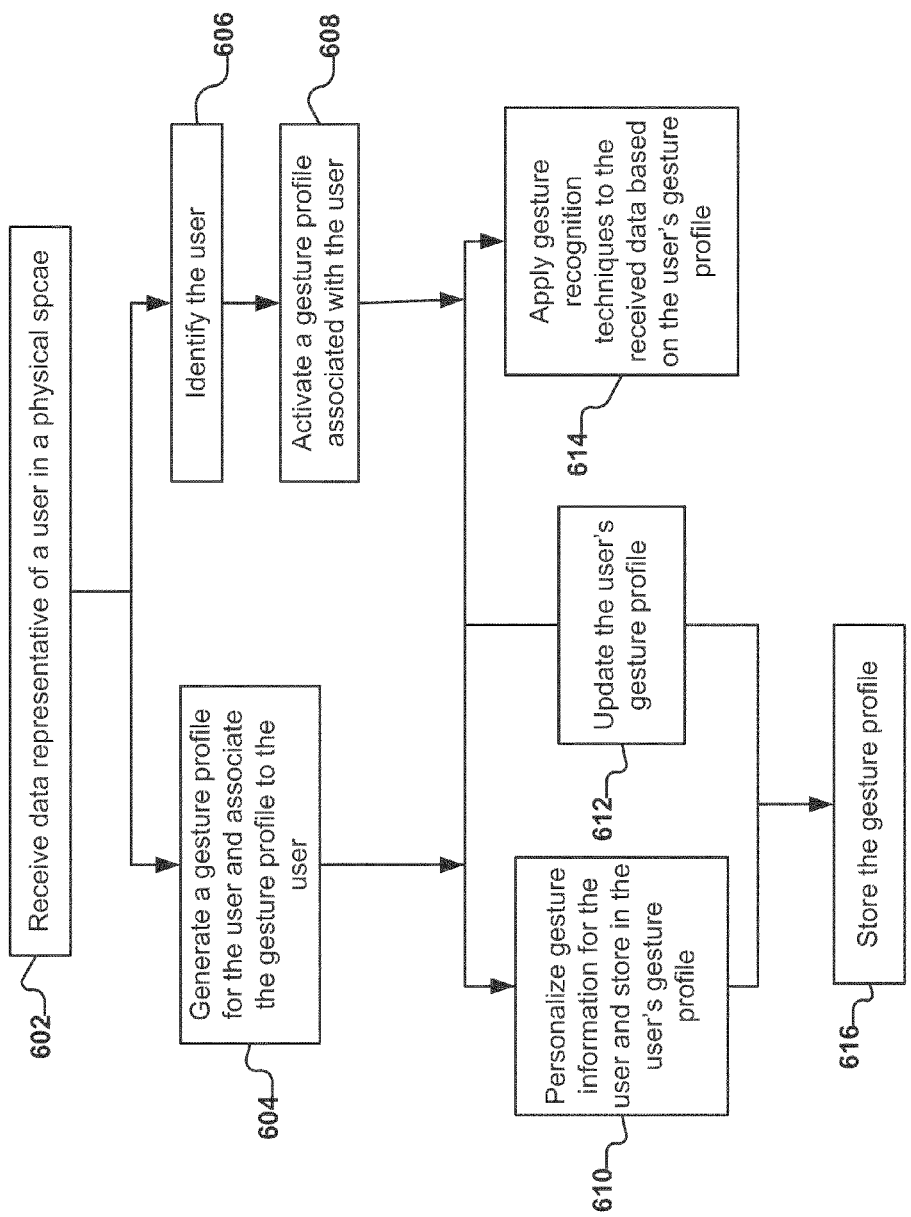
FIG. 6 depicts an example flow diagram for a method of generating or updating a gesture profile and using the gesture profile to refine gesture recognition techniques.

There are a variety of systems, components, and network configurations that support networked computing environments. A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process uses the requested service without having to "know" any working details about the other program or the service itself. In a client/server architecture, particularly a networked system, a client is usually a computer that accesses shared network resources provided by another computer, e.g., a server. In the example of FIG. 6, any computing environment 212, 216, 218, 219 can be considered a client, a server, or both, depending on the circumstances.

In FIG. 2, the network is shown having a connection to server 218. Server 218 may be a computing environment comprising any combination of hardware or software and/or running an operating system that is designed to provide a service. A server 218 is typically, though not necessarily, a remote computer system accessible over a remote or local network 250, such as the Internet. The server may be the host for multi-user, multi-computing environments, providing services to clients on the network 250. The client process may be active in a first computer system, such as computing environment 212, and the server process may be active in a second computer system, such as server 218.

In an example embodiment, a user's gesture profile is maintained by server 218 and when a user logs onto a domain in the network 250, the roaming gesture profile may be downloaded from the server 218 to the local computing environment. For example, in a common client-server architecture, a server 218 may connect to a client such as computing environment 212. The server 218 may have an operating system and access to the gesture profile database 270 that holds various user's gesture profiles. Thus, the roaming gesture profile may be available to any computing environment in the network 250. Even if the network or the server is not available, the local computing environment can create a local cached copy of a gesture profile and track any changes. Changes to the gesture profile may be made locally. When the user logs off, the changes made to the roaming gesture profile may be transferred back to the server 218.

The computing environments 212, 218 may communicate with one another over a communications medium, such as the network 250, thus providing distributed functionality and allowing multiple clients to take advantage of the information-gathering capabilities of the server. Any software objects may be distributed across multiple computing devices or objects. Computing environments 212, 216, 218, 219 may share gesture profile information via the network 250. Thus, any computing environment may generate and/or store a user's gesture profile. Any other computing environment that can communicate over the network 250 may have access to the gesture profile.

In another example embodiment, the computing environment 219 may be a conduit for sharing the gesture profile with other computing environments. For example, the user 204 is shown locally associated with computing environment 219, which for exemplary purposes could be a handheld computing device, such as a PDA or a cell phone. The computing environment 219 may access or otherwise share information with other nodes on the network 250. For example, the gesture profile may be stored at the server 218 and the handheld computing device 219 may communicate over a network 250, such as an Internet connection, with the server 218 to access the gesture profile. In another example embodiment, the computing environment 212 that is local to the user 204 stores the gesture profile and the handheld computing device 219 may communicate with the computing environment 212 to access the gesture profile via the network 250, such as via a local connection, Wi-Fi, etc.

The handheld computing device 219 may be carried to a remote location to be local to another computing environment, such as computing environment 216. Because the handheld computing device 219 is mobile, a gesture profile stored thereon is also mobile. Thus, the user 204 can access and then carry his or her gesture profile on the mobile device to any location. Any time a computing environment is available that can communicate with the handheld computing device 219, the gesture profile may be transferred from the mobile device to the computing environment.

A computing environment that generates or accesses a gesture profile may comprise specifications applicable to the computing environment loading the gesture profile to further modify the gesture information as appropriate. For example, a computing environment may store RGB capabilities, screen size, available input devices, the range of the capture device, the components of the computing environment (e.g., audio/video capabilities), structure information, etc. A user may input additional information, such as the size of the physical room, height of the user, etc. The computing environment may use such information to modify the integration of the gesture profile with the system and/or default gesture information. For example, a gesture may be defined by movement in the physical space that corresponds to movement from a top of a display portion of the display device to a bottom of the display portion of the display device. The user's gesture profile may have been generated by a computing environment with 60 inch display device and comprise a distance between the top and bottom of the display portion that corresponds to the distance on the 60 inch display device. On another computing environment, such as one with a 25 inch display device, the system may identify the smaller distance between the top and bottom of the screen such that the distance for recognizing the gesture corresponds to the smaller screen size. Similarly, if the physical room has a certain size, the computing environment may include the size in the analysis or modification of the integration of a gesture profile with the system and/or default gesture information. For example, if the user stands closer to the screen, the interpretation of the user's gestures may be considered in light of the size of the room.

In another example, the specifications may include information specific to the file structure of the local computing environment. For example, a first computing environment may run programs, load a gesture profile, or store the gesture profile in a particular location of the computing environment's hard drive, and a second computing environment may use a different location.

It is noted that gestures may include dynamic or static movement as well as voice commands, and may be performed to control aspects of the system or an executing application. A gesture may also comprise input derived from the combination of user position or movement captured by a capture device (herein "user position data" or "position data") in conjunction with input derived from another source, such as the press of a button on a controller, or the position of an object in a scene in which the user is captured (herein "additional data"). The system may receive controller input from a wired or wireless controller 213. The user may supplement the motions or poses that he makes with his body that are captured by capture device 202 with input via the buttons, joysticks or other pads of controller 213. For instance, while playing a first-person shooter game, user 204 may point with his arm at a location displayed by the computing environment 212. He may further press a button on controller 213 at substantially the same time. Computing device 212 may recognize the user pointing while pressing a button as a "discharge firearm" gesture.

Thus, a computing environment may not only include a gesture interface but may process instructions configured to use tactile based (input relying on touch) user input. For example, application 222 may comprise such instructions, where application 222 may be any type of program such as operating system, word processor, videogame, etc. In an embodiment where application 222 is an operating system, the operating system can include input output drivers such as mouse drivers, keyboard drivers, a capture device driver, and other I/O drivers such as, for example, touch screen drivers, microphone drivers, videogame controller drivers, or any other human interface device drivers. In an embodiment where application 222 is an application such as a web-browser, a word processor, a picture editing program, etc, application 222 can include executable instructions that request one or more threads to handle and process user input. In this example, application 222 may rely on mouse drivers, keyboard drivers, and other I/O drivers installed on the operating system and OS code to supply it with user interface messages.

A computing environment 212, 216, 218, 219 may process image data and identify variations in the user's gestures from the default gesture data provided with the application. The system may perform personalization by explicitly requesting the user to perform a gesture and capturing data about the gesture. Thus, the system may actively seek gesture profile data by prompting the user to perform a gesture. For example, the system may prompt a user with a basic canned gesture or voice command as a demonstration of the default gesture data and request the user to perform the same gesture. Based on the captured image data, the system may set modifications in the gesture profile based for the requested gesture. The user may initiate the modification to the gesture profile by requesting the system to observe the user's performance of a particular gesture.

The system may implicitly identify personalized features of a gesture by capturing data during execution of a task in real-time. For example, the system may capture image data of a user's gesture and passively make modifications to the gesture profile with or without the user having knowledge of the modifications. For example, while interacting with an application, the user may perform a number of gestures. The system may identify variations in the user's performance of the gesture from the default or pre-packaged gesture data. The system may passively make modifications to a gesture profile, personalizing it for the user based on the identified variations.

In either case, when the user performs the user's version of that gesture or voice command, the system may track information about the user's gesture and add it to the user's gesture profile. To provide information for the user's gesture profile, the user may perform a different motion that the system uses to modify the default gesture data.

While a single user, user 204, is shown associated with computing environments 212 and 219 in FIG. 2, it is contemplated that any number of users may be associated with any computing environment. Further, the computing environment 212 is shown coupled to a capture device 202 and executing an application 222 It is contemplated that any computing environment 212, 216, 218, 219 may be executing or be capable of executing an application and any computing environment may be coupled to or otherwise integrate with a capture device 202. For example, the computing environments 212, 216, 218, 219 may each have an optical drive, for example, and allow for a variety of games to be executed from computer readable instructions stored on optical discs. The games may be stored on a storage device within each computing device, such as a hard drive or solid-state drive. Each computing environment 212, 216, 218, 219 may incorporate a capture device, couple to a capture device, or otherwise have the ability to communicate and share information with a capture device. The capture device may be a component of the computing environment.

Figure 3:
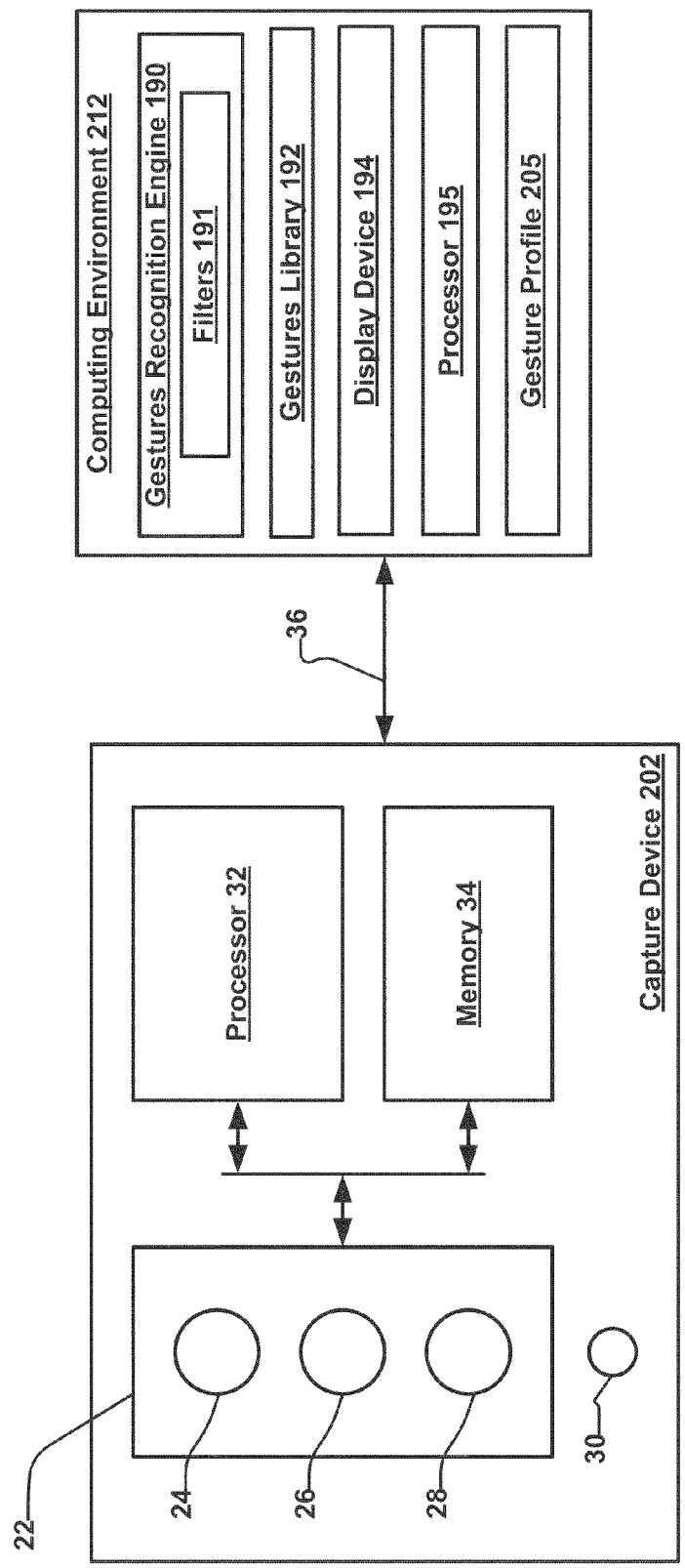
FIG. 3 illustrates an example embodiment of a capture device that may be used in a target recognition, analysis, and tracking system.

FIG. 3 illustrates an example embodiment of the capture device 202 that may be used for target recognition, analysis, and tracking, where the target can be a user or an object. According to an example embodiment, the capture device 202 may be configured to capture video with depth information including a depth image that may include depth values via any suitable technique including, for example, time-of-flight, structured light, stereo image, or the like. According to one embodiment, the capture device 202 may organize the calculated depth information into "Z layers," or layers that may be perpendicular to a Z axis extending from the depth camera along its line of sight.

As shown in FIG. 3, the capture device 202 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 3, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 202 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 202 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 202 to a particular location on the targets or objects.

According to another example embodiment, time-of-flight analysis may be used to indirectly determine a physical distance from the capture device 202 to a particular location on the targets or objects by analyzing the intensity of the reflected beam of light over time via various techniques including, for example, shuttered light pulse imaging.

In another example embodiment, the capture device 202 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 202 to a particular location on the targets or objects.

According to another embodiment, the capture device 202 may include two or more physically separated cameras that may view a scene from different angles, to obtain visual stereo data that may be resolved to generate depth information. In another example embodiment, the capture device 202 may use point cloud data and target digitization techniques to detect features of the user.

The capture device 202 may further include a microphone 30, or an array of microphones. The microphone 30 may include a transducer or sensor that may receive and convert sound into an electrical signal. According to one embodiment, the microphone 30 may be used to reduce feedback between the capture device 202 and the computing environment 212 in the target recognition, analysis, and tracking system 10. Additionally, the microphone 30 may be used to receive audio signals that may also be provided by the user to control applications such as game applications, non-game applications, or the like that may be executed by the computing environment 212.

In an example embodiment, the capture device 202 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction. For example, the computer-readable medium may comprise computer executable instructions for receiving data of a scene, wherein the data includes data representative of the target in a physical space. The instructions comprise instructions for gesture profile personalization and gesture profile roaming, as described herein.

The capture device 202 may further include a memory component 34 that may store the instructions that may be executed by the processor 32, images or frames of images captured by the 3-d camera 26 or RGB camera 28, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 3, the capture device 202 may be in communication with the computing environment 212 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 212 may provide a clock to the capture device 202 that may be used to determine when to capture, for example, a scene via the communication link 36.

Additionally, the capture device 202 may provide the depth information and images captured by, for example, the 3-D camera 26 and/or the RGB camera 28, and a skeletal model that may be generated by the capture device 202 to the computing environment 212 via the communication link 36. The computing environment 212 may then use the skeletal model, depth information, and captured images to, for example, control an application such as a game or word processor. For example, as shown, in FIG. 3, the computing environment 212 may include a gestures library 192.

As shown, in FIG. 3, the computing environment 212 may include a gestures library 192 and a gestures recognition engine 190. The gestures recognition engine 190 may include a collection of gesture filters 191. A filter may comprise code and associated data that can recognize gestures or otherwise process depth, RGB, or skeletal data. Each filter 191 may comprise information defining a gesture along with parameters, or metadata, for that gesture. For instance, a throw, which comprises motion of one of the hands from behind the rear of the body to past the front of the body, may be implemented as a gesture filter 191 comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

While it is contemplated that the gestures recognition engine 190 may include a collection of gesture filters, where a filter may comprise code or otherwise represent a component for processing depth, RGB, or skeletal data, the use of a filter is not intended to limit the analysis to a filter. The filter is a representation of an example component or section of code that analyzes data of a scene received by a system, and comparing that data to base information that represents a gesture. As a result of the analysis, the system may produce an output corresponding to whether the input data corresponds to the gesture. The base information representing the gesture may be adjusted to correspond to the recurring feature in the history of data representative of the user's capture motion. The base information, for example, may be part of a gesture filter as described above. But, any suitable manner for analyzing the input data and gesture data is contemplated.

In an example embodiment, a gesture may be recognized as a trigger for the entry into a modification mode, where a user can modify gesture parameters in the user's gesture profile. For example, a gesture filter 191 may comprise information for recognizing a modification trigger gesture. If the modification trigger gesture is recognized, the application may go into a modification mode. The modification trigger gesture may vary between applications, between systems, between users, or the like. For example, the same gesture in a tennis gaming application may not be the same modification trigger gesture in a bowling game application.

The data captured by the cameras 26, 28 and device 202 in the form of the skeletal model and movements associated with it may be compared to the gesture filters 191 in the gestures library 192 to identify when a user (as represented by the skeletal model) has performed one or more gestures. Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 212 may include a processor 195 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 202 itself, and the raw image data of depth and color (where the capture device 202 comprises a 3D camera 26) values are transmitted to the computing environment 212 via link 36. In another embodiment, the processing is performed by a processor 32 coupled to the camera 402 and then the parsed image data is sent to the computing environment 212. In still another embodiment, both the raw image data and the parsed image data are sent to the computing environment 212. The computing environment 212 may receive the parsed image data but it may still receive the raw data for executing the current process or application. For instance, if an image of the scene is transmitted across a computer network to another user, the computing environment 212 may transmit the raw data for processing by another computing environment.

The computing environment 212 may use the gestures library 192 along with a gesture profile 205 such as that shown in FIG. 2 to interpret movements of the skeletal model and to control an application based on the movements. The computing environment 212 can model and display a representation of a user, such as in the form of an avatar or a pointer on a display, such as in a display device 193. Display device 193 may include a computer monitor, a television screen, or any suitable display device. For example, a camera-controlled computer system may capture user image data and display user feedback on a television screen that maps to the user's gestures. The user feedback may be displayed as an avatar on the screen such as shown in FIG. 1. The avatar's motion can be controlled directly by mapping the avatar's movement to those of the user's movements. The user's gestures may be interpreted control certain aspects of the application.

According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store a gesture profile 205 associated with the user in a computing environment such as computing environment 212. The gesture profile 205 may be specific to a user, application, or a system. The gesture profile 205 may be accessible via an application or be available system-wide, for example. The gesture profile 205 may include lookup tables for loading specific user profile information. The virtual screen may interact with an application that may be executed by the computing environment 212 described above with respect to FIG. 1.

The gesture profile 205 may include user identification data such as, among other things, the target's scanned or estimated body size, skeletal models, body models, voice samples or passwords, the target's gender, the targets age, previous gestures, target limitations and standard usage by the target of the system, such as, for example a tendency to sit, left or right handedness, or a tendency to stand very near the capture device. This information may be used to determine if there is a match between a target in a capture scene and one or more users. If there is a match, the gesture profiles 205 for the user may be loaded and, in one embodiment, may allow the system to adapt the gesture recognition techniques to the user, or to adapt other elements of the computing or gaming experience according to the gesture profile 205.

One or more gesture profiles 205 may be stored in computer environment 212 and used in a number of user sessions, or one or more profiles may be created for a single session only. Users may have the option of establishing a profile where they may provide information to the system such as a voice or body scan, age, personal preferences, right or left handedness, an avatar, a name or the like. Gesture profiles may also be generated or provided for "guests" who do not provide any information to the system beyond stepping into the capture space. A temporary personal profile may be established for one or more guests. At the end of a guest session, the guest gesture profile may be stored or deleted.

The gestures library 192, gestures recognition engine 190, and gesture profile 205 may be implemented in hardware, software or a combination of both. For example, the gestures library 192, and gestures recognition engine 190 may be implemented as software that executes on a processor, such as processor 195, of the computing environment 212 (or on processing unit 101 of FIG. 8 or processing unit 259 of FIG. 9).

It is emphasized that the block diagrams depicted in FIG. 3 and FIGS. 8 and 9 described below are exemplary and not intended to imply a specific implementation. Thus, the processor 195 or 32 in FIG. 1, the processing unit 101 of FIG. 3, and the processing unit 259 of FIG. 4, can be implemented as a single processor or multiple processors. Multiple processors can be distributed or centrally located. For example, the gestures library 192 may be implemented as software that executes on the processor 32 of the capture device or it may be implemented as software that executes on the processor 195 in the computing environment 212. Any combinations of processors that are suitable for performing the techniques disclosed herein are contemplated. Multiple processors can communicate wirelessly, via hard wire, or a combination thereof.

As described above, the gestures library and filter parameters may be tuned for an application or a context of an application by a gesture tool, such as a cultural or environmental context. Similarly, there may be different contexts among different environments of a single application. Take a first-user shooter game that involves operating a motor vehicle. While the user is on foot, making a first with the fingers towards the ground and extending the first in front and away from the body may represent a punching gesture. While the user is in the driving context, that same motion may represent a "gear shifting" gesture.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—may be grouped together into genre packages. These packages may be provided to an application, which may select at least one. The application may tune, or modify, the parameter of a gesture or gesture filter 191 to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-user shooter, action, driving, and sports.

Figure 4:
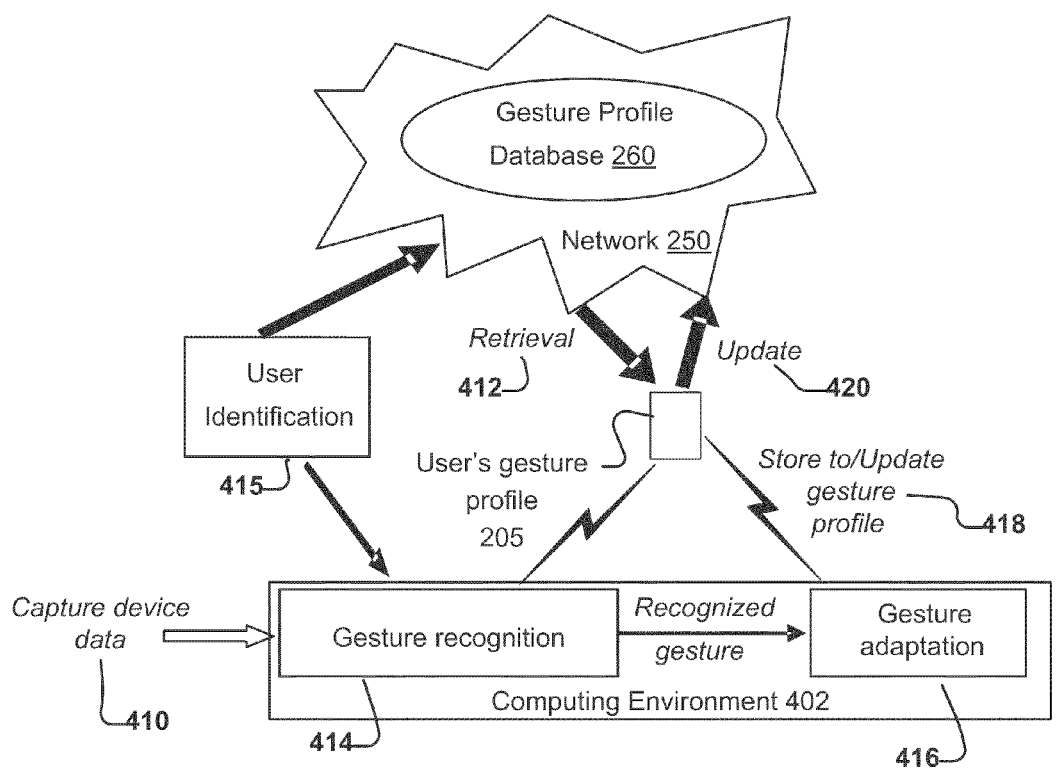
FIG. 4 is a diagram for gesture personalization, update, and roaming over a network.

FIG. 4 is a diagram illustrating a computing environment 402 that may employ a method for gesture recognition, personalization and a gesture profile that may roam over a network 250 such as that described in FIG. 2. For example, at 410, the computing environment 402 may receive capture device data. The capture device data may be representative of a user in the physical space. As described in more detail with respect to FIG. 5A, the computing environment 402 may employ gesture recognition techniques at 414 on the capture data, and the captured data may reveal a gesture.

The computing environment 402 may perform gesture adaptation at 416 to create new gesture information or supplement/replace at least a portion of default gesture information. For example, the computing environment 402 may identify variations in the user's gesture compared to pre-packed or default gesture data. The computing environment may identify parameters that define the variations or better define parameters of the gesture to correspond to the manner in which the gesture is performed by the user.

In this example, a gesture profile 205 is generated by an entity in the network 250 and stored in a gesture profile database 260. When a user interacts with a computing environment 402, such as playing a game on, logging on to, or power on the computing environment 402, the computing environment may retrieve a user's gesture profile 205 via the network 250, at 412. For example, when a user logs onto a client, such as computing environment 212, the user may be prompted for a user name and password. The computing environment 212 may provide the user name, password, and a domain name that identifies the server 218. The user name can be used to locate the gesture profile 205 from the gesture profile database 260 that corresponds to the user.

The gesture profile database 260 can be any form of data storage, including a storage module, device, or memory, for example. The gesture profile database 260 may be a single database or with another database, either separately or combined, may be provided as a database management system, an object-oriented database management system, a relational database management system (e.g. DB2, Access, etc), a file system or another conventional database package. Further, the databases can be accessed via a Structure Query Language (SQL) or other tools known to one of ordinary skill in the art. The gesture profile database 260 can contain an inventory of data about each user, such as a structured storage of profile data and gesture information.

The gesture profile database 260, shown as a single database, represents any number of databases or data stores that include gesture profiles that can be accessed by a system to use for gesture recognition. The gesture profile database 260 can be publicly accessible and searchable and can include information associated with monitoring devices that are both public and private. The information from the gesture profile database 260 can be accessible in a variety of ways, such as via the internet. For example, the computing environment 216 can access the gesture profile database 260 from a web type of browser. A computing environment, such as a server 218, can maintain and update the monitoring device.

Thus, gesture recognition techniques, at 414, may use the gesture profile to assist in the identity of the user's gestures from the capture device data 410. Thus, when the computing environment 402 evaluates the capture device data, analyzing it for a gesture, the computing environment may reference the information in the gesture profile to better recognize a gesture based on gesture information personalized for a particular user.

The computing environment 402 may use user identification data 415 to identify the user and automatically request access to the user's gesture profile, without prompting by the user. For example, the user identification data may comprise logon credentials, a scanned fingerprint, a password, body, gesture, or facial recognition techniques, etc. The user identification data 415 may be stored somewhere on the network or locally on the computing environment 402, and accessed via the network or directly from local storage. For example, the user may log on to the computing environment 402, the network may identify the user's logon, and the network may automatically provide the user's gesture profile 205 from a network database to the computing environment 402.

The computing environment 402 may transmit the gesture profile 205 or the updates to the gesture profile 205 back to the network at 418. At 420, an entity in the cloud or network 250 may update the gesture profile database with the new gesture profile information for the particular user.

Figure 5A:
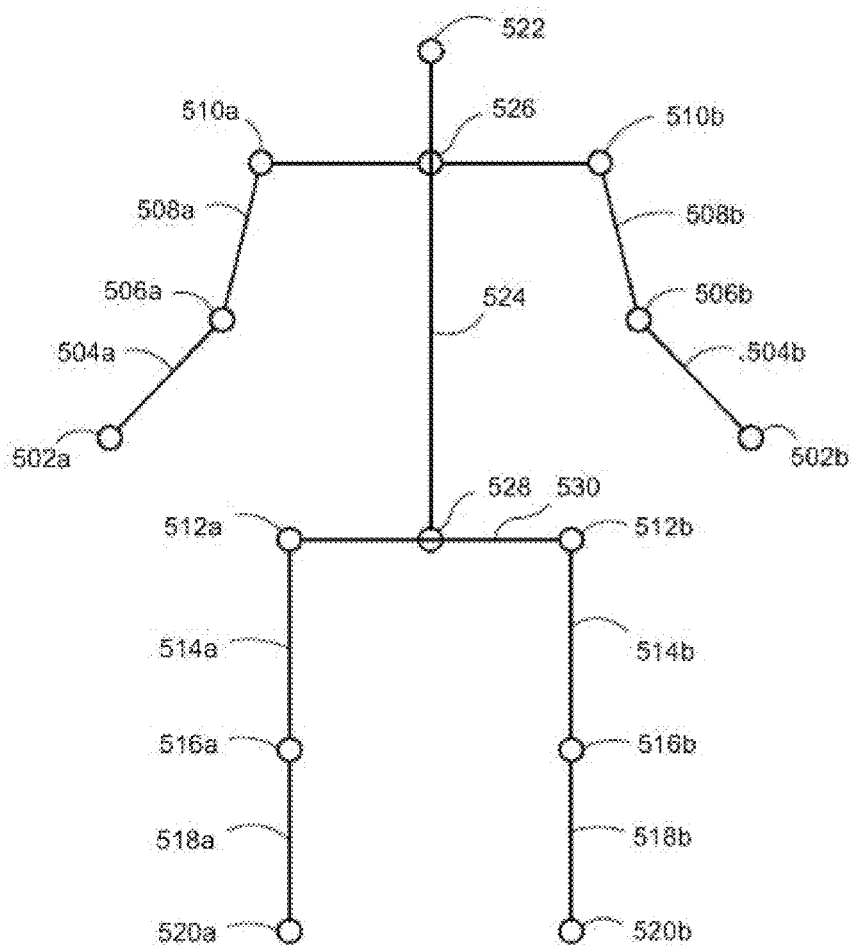
FIG. 5A illustrates further details of a gesture recognizer architecture such as that shown in FIG. 3.

FIG. 5A depicts an example skeletal mapping of a user that may be generated from the capture device 202. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may be a single movement (e.g., a jump) or a continuous gesture (e.g., driving), and may be short in duration or long in duration (e.g., driving for 202 minutes). A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 202. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and breaking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place himself. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned gesture animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as –1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture are important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof. If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. Likewise, a parameter of a transition point could be the identification of the grab gesture, where if the user only partially extends his arm 502-510, thereby not achieving the result of interacting with the ball, the user's gesture also will not meet the parameters of the transition point.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510a, and on the same side of the head 522 as the throwing arm 502a-310a. It may not be necessary to define all bounds of a volume, such as with this throwing gesture, where an outer bound away from the body is left undefined, and the volume extends out indefinitely, or to the edge of scene that is being monitored.

Figure 5B:
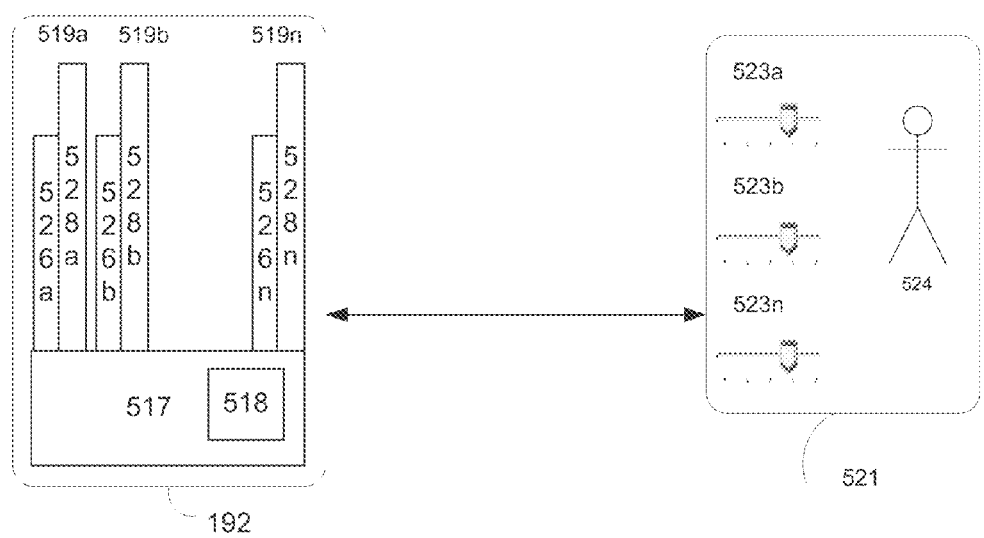
FIG. 5B illustrates a skeletal mapping of a user that has been generated from a target recognition, analysis, and tracking system such as that shown in FIG. 3.

FIG. 5B provides further details of one exemplary embodiment of the gesture recognizer engine 190 of FIG. 2. As shown, the gesture recognizer engine 190 may comprise at least one filter 519 to determine a gesture or gestures. A filter 519 comprises information defining a gesture 526 (hereinafter referred to as a "gesture"), and may comprise at least one parameter 528, or metadata, for that gesture 526. For instance, a throw, which comprises motion of one of the hands from behind the rear of the body to past the front of the body, may be implemented as a gesture 526 comprising information representing the movement of one of the hands of the user from behind the rear of the body to past the front of the body, as that movement would be captured by the depth camera. Parameters 528 may then be set for that gesture 526. Where the gesture 526 is a throw, a parameter 528 may be a threshold velocity that the hand has to reach, a distance the hand must travel (either absolute, or relative to the size of the user as a whole), and a confidence rating by the recognizer engine 190 that the gesture 526 occurred. These parameters 528 for the gesture 526 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine 190 architecture. For instance, there may be a first filter for driving that takes as input skeletal data and outputs a confidence that the gesture 526 associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter 528. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The gesture recognizer engine 190 may have a base recognizer engine 517 that provides functionality to a gesture filter 519. In an embodiment, the functionality that the recognizer engine 517 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

The base recognizer engine 517 may include a gesture profile 518. For example, the base recognizer engine 517 may load a gesture profile 518 into the gesture recognition engine temporarily for a user, store the gesture profile 518 with the gesture filter information, or otherwise access the gesture profile 518 from a remote location. The gesture profile 518 may provide parameters that adapt the information in the filters 519 to correspond to a specific user. For example, as described above, a gesture 526 may be a throw having a parameter 528 for a threshold velocity or a distance the hand must travel. The gesture profile 518 may redefine the threshold velocity or a distance the hand must travel for the throwing gesture 526. The base recognizer engine 517, therefore, may supplement or replace parameters in the filter 519 with parameters from the gesture profile 518. The filters 519 may be default gesture information and the gesture profile 518 may be loaded specifically for a particular user.

Filters 519 are loaded and implemented on top of the base recognizer engine 517 and can utilize services provided by the engine 517 to all filters 519. In an embodiment, the base recognizer engine 517 processes received data to determine whether it meets the requirements of any filter 519. Since these provided services, such as parsing the input, are provided once by the base recognizer engine 517 rather than by each filter 519, such a service need only be processed once in a period of time as opposed to once per filter 519 for that period, so the processing required to determine gestures is reduced.

An application may use the filters 519 provided by the recognizer engine 190, or it may provide its own filter 519, which plugs in to the base recognizer engine 517. Similarly, the gesture profile may plug in to the base recognizer engine 517. In an embodiment, all filters 519 have a common interface to enable this plug-in characteristic. Further, all filters 519 may utilize parameters 528, so a single gesture tool as described below may be used to debug and tune the entire filter system 519.

These parameters 528 may be tuned for an application or a context of an application by a gesture tool 521. In an embodiment, the gesture tool 521 comprises a plurality of sliders 523, each slider 523 corresponding to a parameter 528, as well as a pictorial representation of a body 524. As a parameter 528 is adjusted with a corresponding slider 523, the body 524 may demonstrate both actions that would be recognized as the gesture with those parameters 528 and actions that would not be recognized as the gesture with those parameters 528, iden- tified as such. This visualization of the parameters 528 of gestures provides an effective means to both debug and fine tune a gesture.

FIG. 6 depicts an example flow diagram for a method of generating or updating a gesture profile and using the gesture profile to refine gesture recognition techniques. For example, a system such as that shown in FIGS. 1-4 may perform the operations shown here.

At 602, a system may receive data from a physical space that includes a target, such as a user or a non-human object. As described above, a capture device can capture data of a scene, such as the depth image of the scene and scan targets in the scene. The capture device may determine whether one or more targets in the scene correspond to a human target such as a user. For example, to determine whether a target or object in the scene corresponds to a human target, each of the targets may be flood filled and compared to a pattern of a human body model. Each target or object that matches the human body model may then be scanned to generate a skeletal model associated therewith. For example, a target identified as a human may be scanned to generate a skeletal model associated therewith. The skeletal model may then be provided to the computing environment for tracking the skeletal model and rendering a visual representation associated with the skeletal model.

Any known technique or technique disclosed herein that provides the ability to scan a known/unknown object, scan a human, and scan background aspects in a scene (e.g., floors, walls) may be used to detect features of a target in the physical space. The scan data for each, which may include a combination of depth and RGB data, may be used to create a three-dimensional model of the object. The RGB data is applied to the corresponding area of the model. Temporal tracking, from frame to frame, can increase confidence and adapt the object data in real-time. Thus, the object properties and tracking of changes in the object properties over time may be used to reliably track objects that change in position and orientation from frame to frame in real time. The capture device captures data at interactive rates, increasing the fidelity of the data and allowing the disclosed techniques to process the raw depth data, digitize the objects in the scene, extract the surface and texture of the object, and perform any of these techniques in real-time such that the display can provide a real-time depiction of the scene.

The system may generate a gesture profile for a user and associate the gesture profile to a particular user at 604. The system may generate the gesture profile for storing gesture information that is specific to the particular user. For example, a capture device may identify unique characteristics or parameters of a user's gesture and populate the gesture profile with such information.

A gesture profile may already exist for the user. At 606, the system may identify the user, such as by identifying the user's logon credentials or by comparing image data of the user to profile information, for example. Upon identification, at 608 the system may activate a gesture profile associated with the user. The system may receive the gesture profile from an internal storage medium, a mobile storage medium inserted or otherwise communicating with the system, or from a remote entity via a network.

The system may determine if a user performs a gesture and use the gesture to control a program. For example, a gesture may comprise a user's position or motion that may be captured as image data and parsed for meaning. The parsed image data can be filtered by a gesture recognition engine, for example, to determine if a gesture was performed. At 610, the system may personalize a user's gesture profile with gesture information that is specific to the user. For example, the user may perform a gesture in a particular manner, and the system may store parameters that correspond to the user's manner of performing the gesture in the user's gesture profile. The personalization of the gesture profile may occur when the user profile is generated, thereby initially calibrating the gesture profile. The gesture profile may also be updated at 612, any time after the generation of the gesture profile.

At 614, the gesture recognition techniques may be applied to the received data based on the user's gesture profile. For example, to determine if a gesture was performed, the gesture recognition may use gesture information from a gesture profile personalized for a user to identify the user's gestures.

At 616, the gesture profile may be stored with the personalized gesture information for the user. The gesture profile may be stored locally or transmitted to another entity, such as a remote server that provides a service, and stored remotely.

Figure 7:
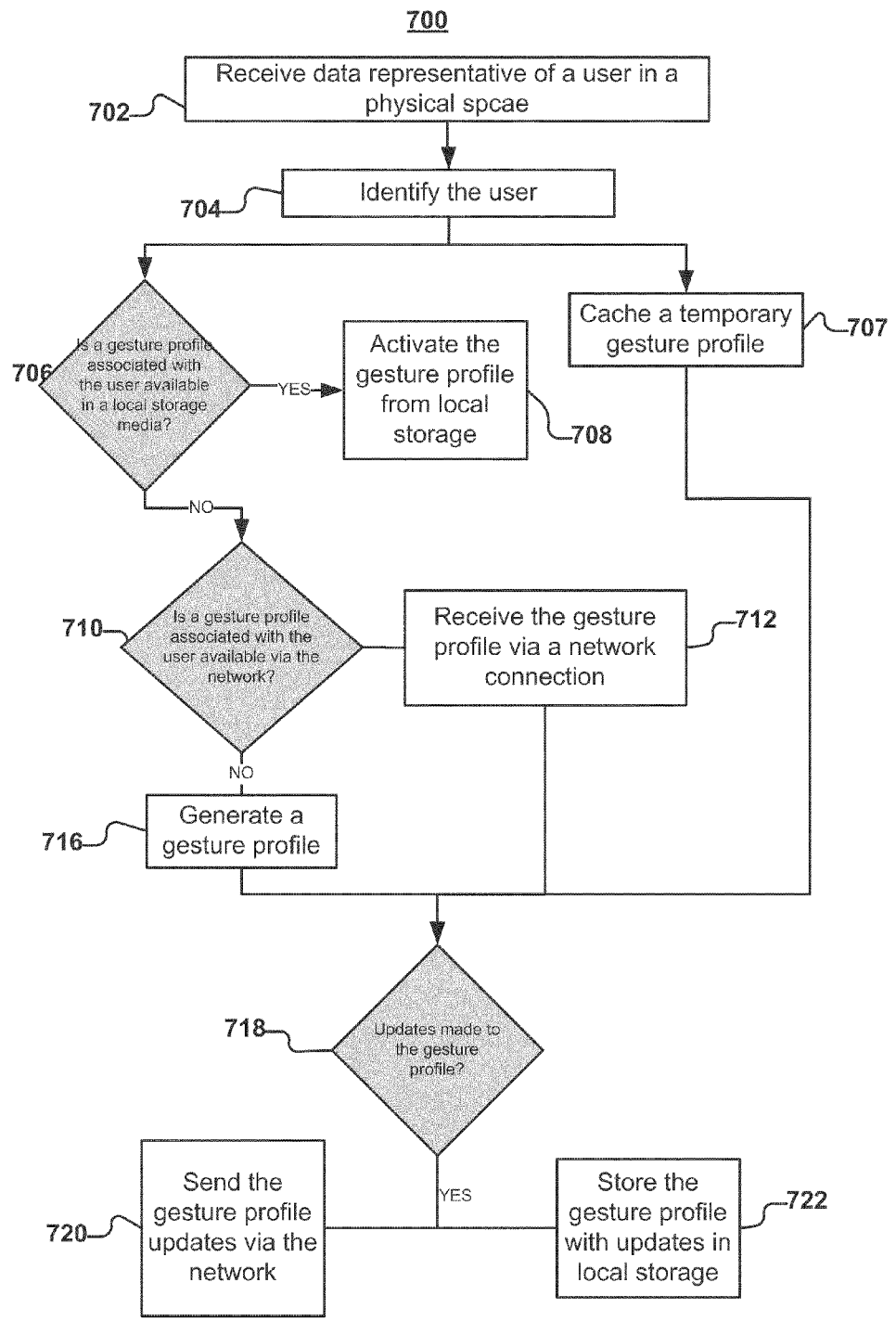
FIG. 7 depicts an example flow diagram for a method of gesture profile roaming.

FIG. 7 depicts an example flow diagram for a method of gesture profile roaming. For example, any one of the systems described herein or a similar system or computing environment may perform a method for gesture profile roaming. At 702, the system may receive data representative of a user in a physical space. At 704, the system may use techniques to identify the user. The system may make the determination at 706 whether or not a gesture profile associated with the user is available in a local storage medium. If there is a locally stored gesture profile, the system may activate the gesture profile from local storage. In other words, the system can load the gesture profile for use in gesture recognition. Alternately, the system may cache a temporary gesture profile at 705.

At 710, the system may make the determination whether or not a gesture profile associated with the user is available via a network. If there is, the system may receive the user's roaming gesture profile via the network connection. For example, a network may be a network described with respect to FIG. 2 or FIG. 3 and may comprise any wired or wireless connection to another computing environment or system that may store the user's gesture profile. The networked computing environment or system may maintain a gesture profile database and store gesture profiles that are capable of roaming for a number of users. When a user with a roaming profile logs onto a computing environment, the computing environment may check for a local gesture profile and compare it to the roaming gesture profile. If the cached local gesture profile is more recent than the roaming profile, the system may load the local gesture profile instead of the roaming profile. A time stamp may be included in the local and/or remote gesture profile to indicate the timing of each modification made to the gesture profile.

If a gesture profile is not available for the user at 710, the system may generate a gesture profile at 712 for the user such as in the manner described in FIG. 6. Whether or not a gesture profile is available locally or via the network, the system may use the cached gesture profile from 707 for use during the session or for storing on the local computing environment.

Updates to the gesture profile may be made at 718. Updates to the gesture profile generated at 712 or to a cached temporary gesture profile at 714 can be uploaded to the gesture profile in the network location via the network at 720. The updates to the gesture profile may be stored locally in local storage at 722.

In an example embodiment a computer readable storage media can store executable instructions for performing the techniques disclosed herein, such as those described in FIGS. 6 and 7. For example, a readable storage media can be a part of computing environment, however in other embodiments the computer readable storage media could be a part of capture device. The instructions may provide instructions for generating a gesture profile personalized for a user, wherein the instructions comprise instructions for receiving data of a physical space, wherein the data is representative of a user's gesture in the physical space; identifying characteristics of the user's gesture from the data; generating the gesture profile associated with the user; and populating the user's gesture profile with personalized gesture information for the user's gesture based on the characteristics of the user's gesture. The instructions may further comprise instructions for providing the user's gesture profile for roaming in a network. The instructions may be written to identify variations of the user's gesture from default gesture information, wherein the personalized gesture information is indicative of the variations from the default gesture information. The instructions may comprise instructions for recognizing the user's gesture by comparing the received data to the personalized gesture information in the generated gesture profile. The instructions may instruct to store the gesture profile in at least one of a local media, a remote media, in a cache, on a local computing environment, on a remote computing environment, on a removable media, or on non-removable media. And, the instructions may instruct to activate the gesture profile in response to a triggering event, wherein the triggering event is at least one of a user identity, a computing environment powering on, the user logging on, an execution of an application, a recognition of the computing environment, or a request by the user. The instructions may generate a request to the user to perform the gesture for identifying characteristics of the user's gesture.

The computer executable instructions may comprise instructions for roaming a gesture profile, comprising instructions for identifying the gesture profile associated with a user, wherein the gesture profile comprises personalized gesture information for the user, and wherein the personalized gesture information is derived from data captured by a capture device and representative of a user's position or motion in a physical space; and roaming the gesture profile via a network connection. The instructions may further comprise instructions for receiving a request for the gesture profile, activating the gesture profile based on an identity of the user, and identifying the user from profile data.

The computer executable instructions may also comprise instructions for gesture recognition based on a user's gesture profile, including instructions for activating a gesture profile associated with a user, wherein the gesture profile comprises personalized gesture information for the user, and wherein the personalized gesture information is derived from data captured by a capture device and representative of a user's position or motion in a physical space; and recognizing a user's gesture by comparing the received data to the personalized gesture information in the gesture profile.

Figure 8:
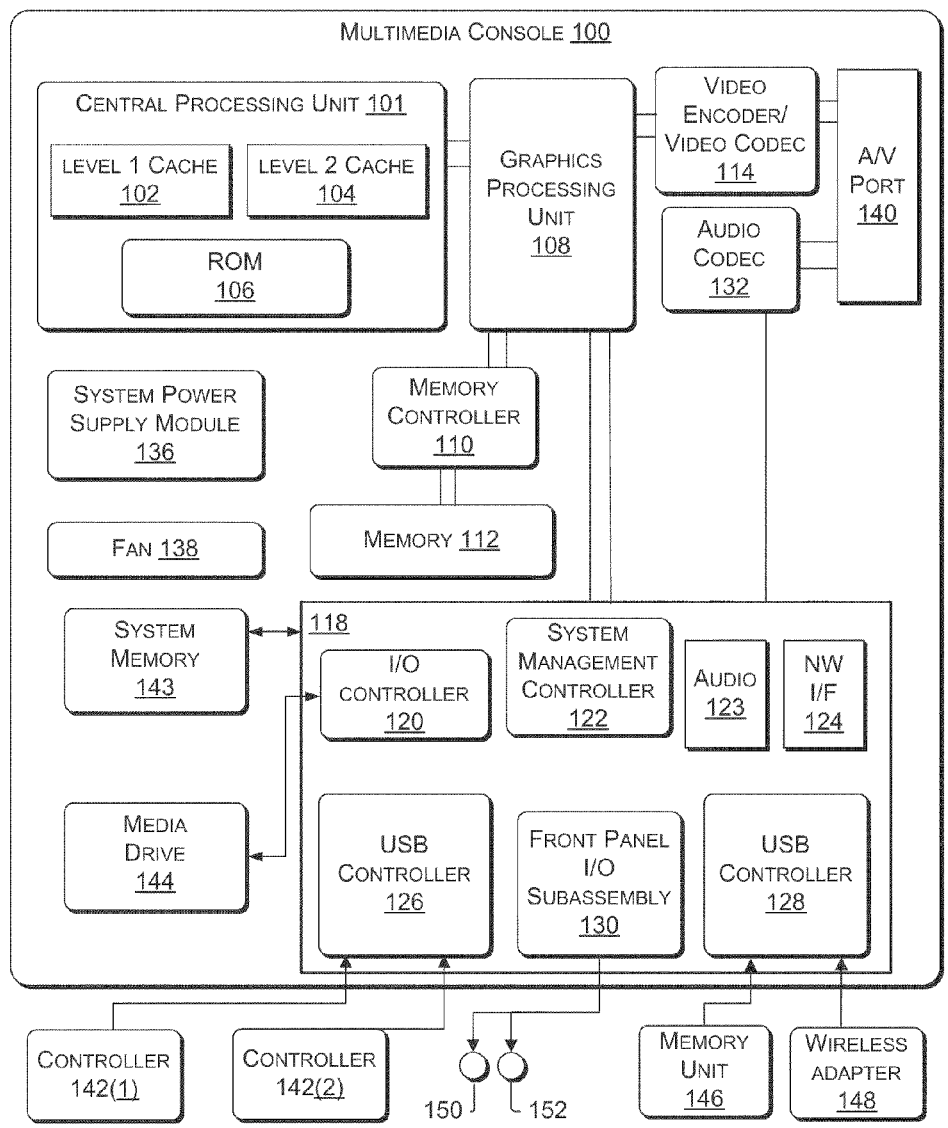
FIG. 8 illustrates an example embodiment of a computing environment in which the techniques described herein may be embodied.

FIG. 8 illustrates an example embodiment of a computing environment that may be used to interpret one or more gestures in a target recognition, analysis, and tracking system. The computing environment such as the computing environment 212 described above with respect to FIG. 1 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM

106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 2120, a system management controller 2122, an audio processing unit 2123, a network interface controller 2124, a first USB host controller 2126, a second USB controller 2128 and a front panel I/O subassembly 130 that are preferably implemented on a module 118. The USB controllers 2126 and 2128 serve as hosts for peripheral controllers 142(1)-142(2), a wireless adapter 148, and an external memory device 146 (e.g., flash memory, external CD/DVD ROM drive, removable media, etc.). The network interface 2124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 2120 via a bus, such as a Serial ATA bus or other high speed connection (e.g., IEEE 1394).

The system management controller 2122 provides a variety of service functions related to assuring availability of the multimedia console 100. The audio processing unit 2123 and an audio codec 132 form a corresponding audio processing pipeline with high fidelity and stereo processing. Audio data is carried between the audio processing unit 2123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button lnposelstart152lnposelend, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 2124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 202 may define additional input devices for the console 100.

Figure 9:
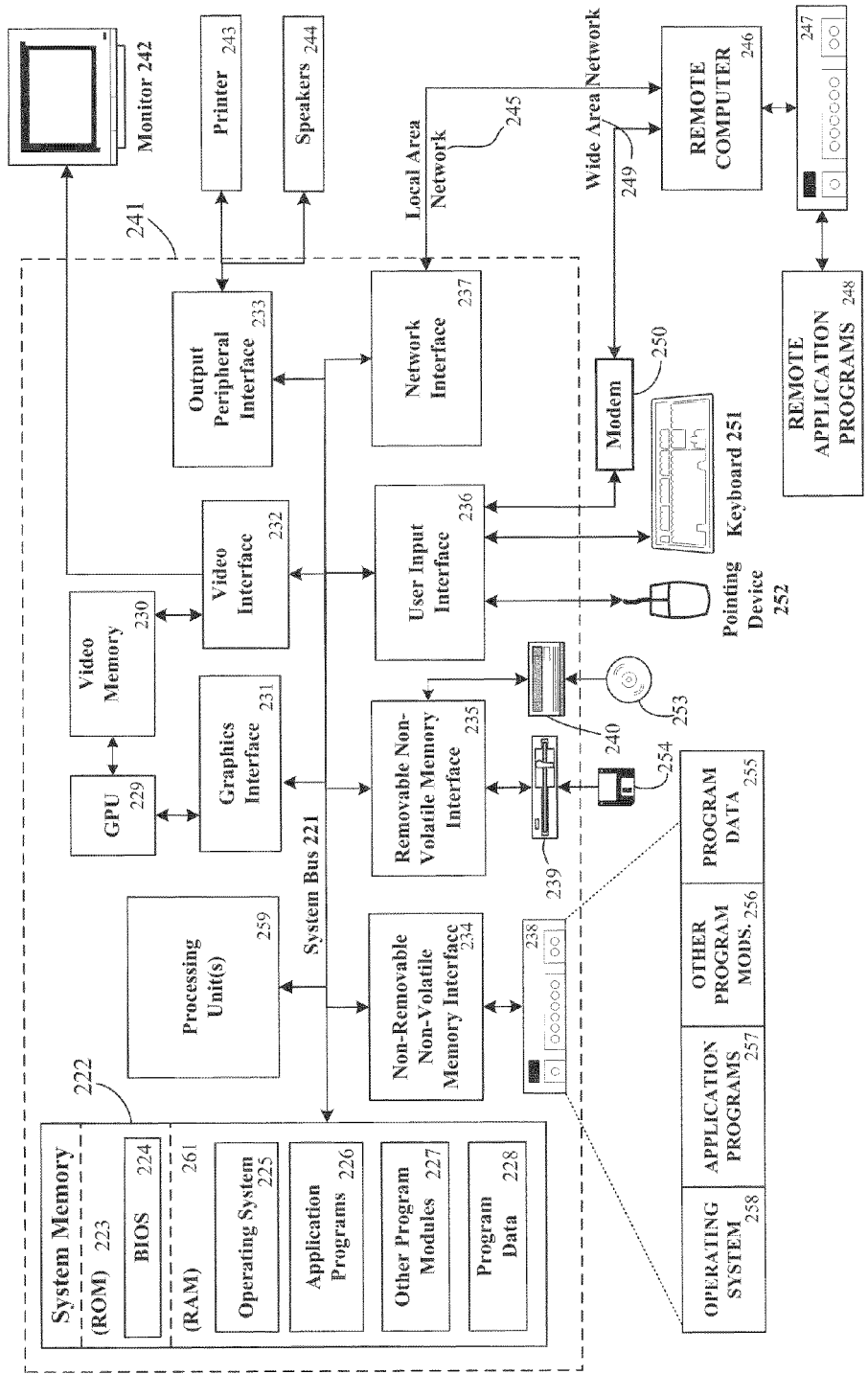
FIG. 9 illustrates another example embodiment of a computing environment in which the techniques described herein may be embodied.

FIG. 9 illustrates another example embodiment of a computing environment 220 that may be the computing environment 212 shown in FIG. 1 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 261. A basic input/output system 224 (BIOS), containing the basic routines that help to transfer information between elements within computer 241, such as during start-up, is typically stored in ROM 223. RAM 261 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 202 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and sub-combinations of the various processes, systems and configurations, and other features, functions, acts, and/or properties disclosed herein, as well as any and all equivalents thereof. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A method for generating a personalized gesture profile from a default gesture profile, the method comprising:
   receiving from a capture device depth image data representative of a user's gesture in a three-dimensional physical space;
   comparing the depth image data to default gesture information in the default gesture profile to determine if the user is performing a particular gesture that is recognized as invoking a particular command to a computer;
   identifying an attribute of the user's gesture that differs from a corresponding attribute of the default gesture recognized as invoking the particular command to the computer, the attribute of the user's gesture comprising a threshold velocity to be reached by a body part of the user, a distance to be traveled by the body part of the user, and a confidence level required to establish that the user has performed the particular gesture;
   modifying parameters of the attributes of the default gesture recognized as invoking the particular command to the computer based on the attribute of the user's gesture that differs from the parameters of the attributes of the default gesture recognized as invoking the particular command to the computer; and
   populating the personalized gesture profile for the user with personalized gesture information for the user's gesture based on the modified attribute parameters.

2. The method of claim 1, further comprising:
   providing the user's personalized gesture profile for roaming in a network.

3. The method of claim 1, further comprising:
   identifying variations of the user's gesture from default gesture information, wherein the personalized gesture information is indicative of the variations from the default gesture information.

4. The method of claim 1, wherein the generation of the personalized gesture profile is initiated by at least one of a computing environment, a host, a system administrator, a client, or the user.

5. The method of claim 1, wherein the personalized gesture profile is initiated with at least one of user profile data, a context of the user, a context of a computing environment, or input by the user.

6. The method of claim 1, further comprising:
   recognizing the user's gesture by comparing the received depth image data to the personalized gesture information in the personalized gesture profile.

7. The method of claim 6, wherein the personalized gesture information in the personalized gesture profile at least one of supplements, replaces, or supersedes default gesture information.

8. The method of claim 1, wherein the attribute of the user's gesture comprises at least one of a user's facial expression, a body position, language, speech patterns, a word spoken, history data, or voice recognition information, text, geometric data, a volume of space, a size, a shape, a depth, a series of images, an angle, a distance between points, or a height.

9. The method of claim 1, further comprising:
   storing the personalized gesture profile in at least one of a local media, a remote media, in a cache, on a local computing environment, on a remote computing environment, on a removable media, or on non-removable media.

10. The method of claim 1, further comprising:
    activating the personalized gesture profile in response to a triggering event, wherein the triggering event is at least one of a user identity, a computing environment powering on, the user logging on, an execution of an application, a recognition of the computing environment, or a request by the user.

11. The method of claim 1, wherein the personalized gesture information is derived from the received depth image data and is representative of a user's position or motion in the physical space.

12. The method of claim 1, further comprising:
    actively requesting the user to perform the gesture for identifying an attribute of the user's gesture.

13. The method of claim 1, wherein the personalized gesture profile comprises segments and at least one segment is applicable to at least one of an application, the user, a computing environment, or a physical environment.

14. The method of claim 1, wherein the personalized gesture profile comprises at least one of a computer representation of information associated with the user, a mathematical expression, a collection of wire frame snapshots, image data, animations, text, geometric data, a speed, a volume of space, a size, a shape, a depth, a series of images, an angle, a distance between points, a user's preference, or a height.

15. A system for generating a personalized gesture profile from a default gesture profile, comprising:
    a processor; and
    a memory communicatively coupled to the processor when the system is operational, the memory bearing processor-executable instructions that, when executed on the processor, cause the system at least to:

receive from a capture device depth image data representative of a user's gesture in a three-dimensional physical space;

compare the depth image data to default gesture information in the default gesture profile to determine if the user is performing a particular gesture that is recognized as invoking a particular command to a computer;

identify an attribute of the user's gesture that differs from a corresponding attribute of the default gesture recognized as invoking the particular command to the computer, the attribute of the user's gesture comprising a threshold velocity to be reached by a body part of the user, a distance to be traveled by the body part of the user, and a confidence level required to establish that the user has performed the particular gesture;

modify parameters of the attributes of the default gesture recognized as invoking the particular command to the computer based on the attribute of the user's gesture that differs from the parameters of the attributes of the default gesture recognized as invoking the particular command to the computer; and populate the personalized gesture profile for the user with personalized gesture information for the user's gesture based on the modified attribute parameters.

16. The system of claim 15, wherein the memory further bears instructions that, when executed on the processor, cause the system at least to:

provide the user's personalized gesture profile for roaming in a network to a second computer.

17. The system of claim 15, wherein the memory further bears instructions that, when executed on the processor, cause the system at least to:

identify variations of the user's gesture from default gesture information, wherein the personalized gesture information is indicative of the variations from the default gesture information.

18. The system of claim 15, wherein the generation of the personalized gesture profile is initiated by at least one of a computing environment, a host, a system administrator, a client, or the user.

19. The system of claim 15, wherein the personalized gesture profile is initiated with at least one of user profile data, a context of the user, a context of a computing environment, or input by the user.

20. The system of claim 15, wherein the memory further bears instructions that, when executed on the processor, cause the system at least to:

recognize the user's gesture by comparing the received depth image data to the personalized gesture information in the generated personalized gesture profile.

21. A computer-readable storage device storing computer-executable instructions for generating a personalized gesture profile from a default gesture profile when the instructions are executed on a computer, the instructions, when executed, causing the computer to perform operations comprising:

receiving from a capture device depth image data representative of a user's gesture in a three-dimensional physical space;

comparing the depth image data to default gesture information in the default gesture profile to determine if the user is performing a particular gesture that is recognized as invoking a particular command to a computer;

identifying an attribute of the user's gesture that differs from a corresponding attribute of the default gesture recognized as invoking the particular command to the computer, the attribute of the user's gesture comprising a threshold velocity to be reached by a body part of the user, a distance to be traveled by the body part of the user, and a confidence level required to establish that the user has performed the particular gesture;

modifying parameters of the attributes of the default gesture recognized as invoking the particular command to the computer based on the attribute of the user's gesture that differs from the parameters of the attributes of the default gesture recognized as invoking the particular command to the computer; and populating the personalized gesture profile for the user with personalized gesture information for the user's gesture based on the modified attribute parameters.

* * * * *